United States Patent
Giddings et al.

(10) Patent No.: US 11,659,858 B2
(45) Date of Patent: May 30, 2023

(54) APPARATUS AND METHOD FOR PACKAGING CONES

(71) Applicant: Cascade Manufacturing Solutions, LLC, Portland, OR (US)

(72) Inventors: Christopher Giddings, Gresham, OR (US); Roger Sunday, Portland, OR (US)

(73) Assignee: Cascade Manufacturing Solutions, LLC, Portland, OR (US)

( * ) Notice: Subject to any disclaimer, the term of this patent is extended or adjusted under 35 U.S.C. 154(b) by 300 days.

(21) Appl. No.: 16/937,230

(22) Filed: Jul. 23, 2020

(65) Prior Publication Data
US 2021/0022389 A1    Jan. 28, 2021

Related U.S. Application Data

(60) Provisional application No. 62/878,109, filed on Jul. 24, 2019.

(51) Int. Cl.
| | |
|---|---|
| *A24C 5/54* | (2006.01) |
| *B65B 1/40* | (2006.01) |
| *B65B 1/12* | (2006.01) |
| *B65B 1/06* | (2006.01) |
| *B65B 1/24* | (2006.01) |
| *B65B 49/08* | (2006.01) |
| *A24C 5/02* | (2006.01) |
| *G05B 15/02* | (2006.01) |
| *A24C 5/00* | (2020.01) |
| *G06F 3/0484* | (2022.01) |

(52) U.S. Cl.
CPC ............. *A24C 5/54* (2013.01); *A24C 5/002* (2013.01); *A24C 5/02* (2013.01); *B65B 1/06* (2013.01); *B65B 1/12* (2013.01); *B65B 1/24* (2013.01); *B65B 1/40* (2013.01); *B65B 49/08* (2013.01); *G05B 15/02* (2013.01); *G06F 3/0484* (2013.01)

(58) Field of Classification Search
CPC .. A24C 5/54; A24C 5/002; A24C 5/02; B65B 1/06; B65B 1/12; B65B 1/24; B65B 1/40; B65B 49/08; G05B 15/02; G06F 3/0484
See application file for complete search history.

(56) References Cited

U.S. PATENT DOCUMENTS

| | | | | |
|---|---|---|---|---|
| 4,572,216 | A * | 2/1986 | Josuttis | A24C 5/42 131/70 |
| 7,905,235 | B2 * | 3/2011 | Patel | A24C 5/40 131/57 |
| 10,028,618 | B1 * | 7/2018 | Benson | A47J 42/50 |
| 10,440,984 | B1 * | 10/2019 | Richmond | A24C 5/392 |
| 10,751,722 | B1 * | 8/2020 | Pearson | B02C 4/42 |

(Continued)

*Primary Examiner* — Nicolas A Arnett

(57) ABSTRACT

A system and method for closing and sealing a cone is provided. One embodiment extends a first closing head in a first downward slant onto an open top of the cone filled with the smokable material to form a first fold on the top of the cone; extends a sealing head downward onto the first fold; extends a second closing head in a second downward slant onto the open top of the cone to form a second fold on the top of the cone; extends the sealing head downward onto the first fold and the second fold; extends a third closing head in a third downward slant onto the open top of the cone to form a third fold on the top of the cone; and extends the sealing head downward onto the first fold, the second fold, and the third fold.

17 Claims, 14 Drawing Sheets

(56) References Cited

U.S. PATENT DOCUMENTS

| | | | |
|---|---|---|---|
| 10,905,153 B1* | 2/2021 | Sinclair, Jr. | A24D 1/008 |
| 11,058,144 B2* | 7/2021 | Mullen | A24C 5/54 |
| 11,130,596 B2* | 9/2021 | Holderman | A24C 5/06 |
| 11,148,835 B2* | 10/2021 | Holderman | B31B 50/52 |
| 11,178,900 B2* | 11/2021 | Giddings | A24C 5/002 |
| 11,246,336 B2* | 2/2022 | Holderman | A24C 5/397 |
| 11,332,268 B2* | 5/2022 | Giddings | B65B 1/24 |
| 11,382,352 B2* | 7/2022 | Yamay | A24C 5/54 |
| 11,485,523 B2* | 11/2022 | Holderman | B65B 39/12 |
| 11,523,632 B2* | 12/2022 | Giddings | A24C 5/54 |
| 2018/0279668 A1* | 10/2018 | Chan | A24C 5/321 |
| 2019/0297936 A1* | 10/2019 | Kang | A24C 3/00 |
| 2019/0320707 A1* | 10/2019 | Boucher | A24C 5/02 |
| 2019/0320709 A1* | 10/2019 | Kaufmann | A24C 5/06 |
| 2019/0320710 A1* | 10/2019 | Sirois | A24C 5/44 |
| 2020/0068947 A1* | 3/2020 | Leadbeater | A24C 5/34 |
| 2020/0367549 A1* | 11/2020 | Kamer | A24C 5/002 |
| 2020/0399006 A1* | 12/2020 | Cottone | B65B 29/00 |
| 2021/0022388 A1* | 1/2021 | Sullivan | A24C 5/02 |
| 2021/0022389 A1* | 1/2021 | Giddings | B65B 1/24 |
| 2021/0024232 A1* | 1/2021 | Giddings | G05B 15/02 |
| 2021/0024233 A1* | 1/2021 | Giddings | B65B 1/40 |
| 2021/0030054 A1* | 2/2021 | Godwin | A24C 5/02 |
| 2021/0169133 A1* | 6/2021 | Ahn | A24C 5/08 |
| 2021/0177045 A1* | 6/2021 | Mullen | A24C 5/54 |
| 2021/0267264 A1* | 9/2021 | Grigsby | A24D 1/18 |
| 2021/0392944 A1* | 12/2021 | Kustal | A24C 5/02 |
| 2022/0110359 A1* | 4/2022 | Giddings | A24C 5/002 |
| 2022/0132910 A1* | 5/2022 | Yamay | A24C 5/54 |
| | | | 131/58 |

\* cited by examiner

APPARATUS AND METHOD FOR PACKAGING CONES

CLAIM OF PRIORITY

This application claims priority to U.S. provisional application entitled, "Precision *Cannabis* Cone Loader and Filler." having Ser. No. 62/878,109, filed Jul. 24, 2019, which is entirely incorporated herein by reference.

BACKGROUND OF THE INVENTION

Various systems have been developed to package cones with smokable materials. In the context of *cannabis* consumption, a cone is a type of "joint" that is more conical in shape than a conventional tubular shaped joint or cigarette. The cone preferably starts straight and relatively narrow on one end, and then widens as the cone get longer when moving to the top of the cone that is lit by the user. After the smokable material, here *cannabis*, is placed into the interior of the cone, the cone top may be pinched, twisted, folded, or otherwise sealed to retain the smokable material within the cone. A filter, stone, crutch, or the like may optionally be placed in the bottom of the cone (the narrow end) where the user draws the smoke from to prevent resin and/or particulates from exiting the bottom of the cone.

Cones are typically made of paper, or a paper-like sheet of burnable material, that are preformed prior to filling with the smokable material. Preferably, the cone material, when burned during consumption, does not add undesirable flavors, smells, or other harmful chemicals into the smoke that is inhaled by the user.

A variety of pre-formed cones are available on the commercial market. Because of the many different vendors of pre-formed cones, the available pre-formed cones come in a variety of different shapes and/or sizes that are designed to hold different amounts of smokable material. Thus, legacy cone filling devices or systems have difficulty handling cones of different shapes and/or sizes during the filling process. Further, legacy cone filling devices or systems have difficulty controlling precise predefined amounts of the smokable material that is added into the various different shapes and/or sizes of the pre-formed cones.

Accordingly, in the arts of cone filling devices, there is a need in the arts for improved methods, apparatus, and systems for filling cones with smokable materials.

SUMMARY OF THE INVENTION

Embodiments of the cone closing system closes and seals a cone filled with smokable material. One embodiment extends a first closing head in a first downward slant onto an open top of the cone filled with the smokable material to form a first fold on the top of the cone; extends a sealing head downward onto the first fold; extends a second closing head in a second downward slant onto the open top of the cone to form a second fold on the top of the cone; extends the sealing head downward onto the first fold and the second fold; extends a third closing head in a third downward slant onto the open top of the cone to form a third fold on the top of the cone; and extends the sealing head downward onto the first fold, the second fold, and the third fold.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
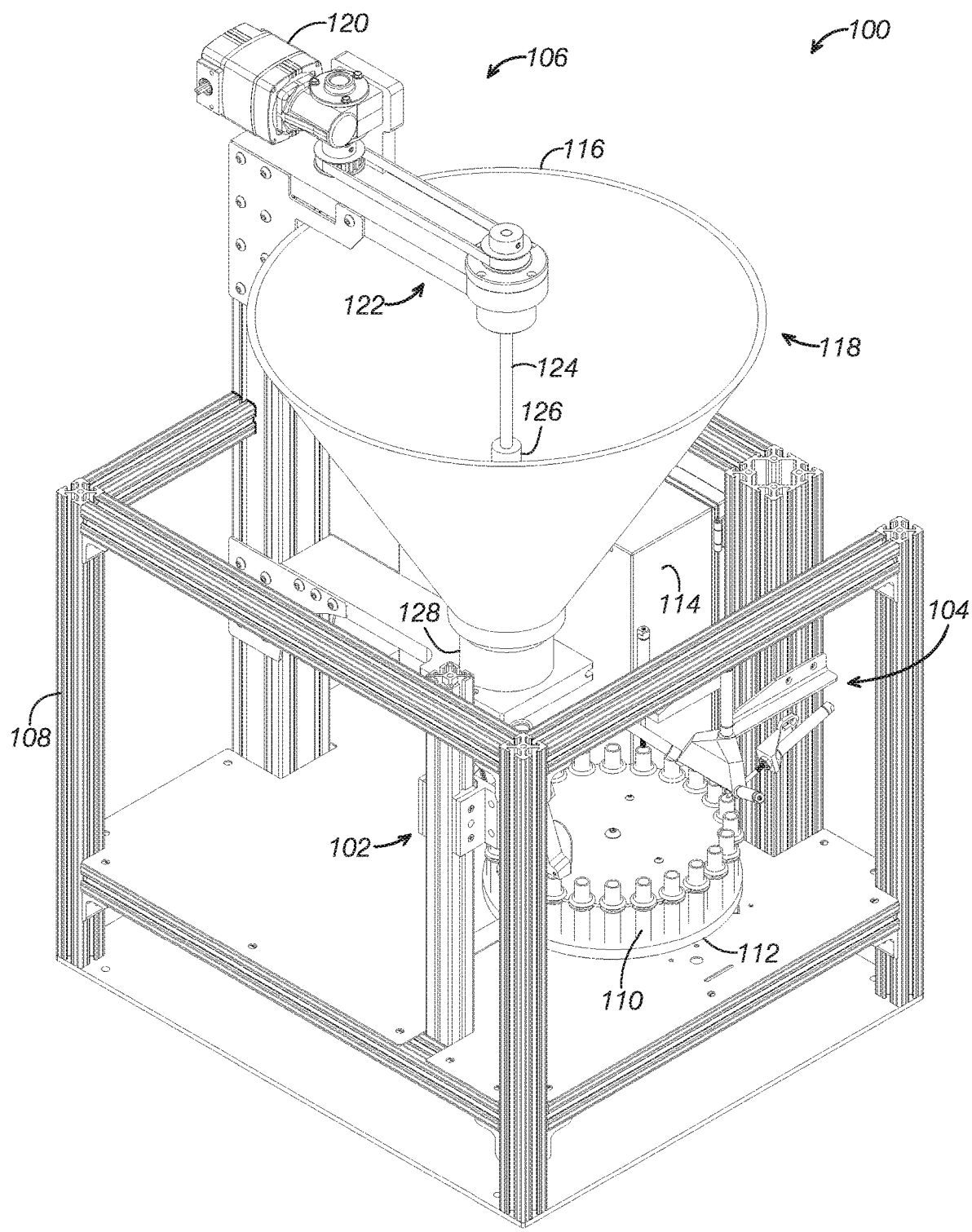
FIG. 1 is a perspective diagram of an example cone filling system.

FIG. 1 is a block diagram of an example cone filling system 100. Embodiments of the cone filling system 100 comprise a cone dispenser system 102, a cone top sealing system 104, and an auger load system 106 secured on a frame 108. The cone dispenser system 102 dispenses individual cones in the cone receptacles 110 residing in the cone carousel 112. The auger control system 106 dispenses smokable material into an individual cone residing in a cone receptacle 110. A cone filler control system 114 manages the operation of the cone dispenser system 102, the cone top sealing system 104, the auger load system 106, and other components of the cone filling system 100.

The disclosed systems and methods for filling cones with smokable material using the cone filling system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods filling cones with smokable material using the cone filling system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising." "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is communicatively connected to another electronic device, either wirelessly or with a wire based connector, whether directly or indirectly through a communication network, wire based connector, or a wireless connection.

Returning to FIG. 1, the example cone filling system 100 comprises a hopper 116 configured to receive some amount of smokable material that is added into a top portion 118 of the hopper 116. In response to a global start cycle generated by the cone filler control system 114, a plurality of operations are concurrently performed. A cone loading stage performs a first operation, interchangeably referred to herein as a cone dispensing operation, to dispense a single empty cone into an empty first cone receptacle 110 by the cone dispenser system 102. A cone filling stage performs a second operation, interchangeably referred to herein as a cone filling operation, that adds a predefined amount of smokable material into the empty cone residing in a second one of the cone receptacles 110 of the cone carousel 112. In some embodiments, an optional third operation referred to herein as a tamping process (cone tamping stage) is performed on a filled cone to compress the smokable material that has been added into the cone during the cone filling stage. A cone closing stage performs a fourth operation, interchangeably referred to herein as a cone folding stage, where the top of a filled cone residing in a third one of the cone receptacles 110 is folded and sealed by the cone top sealing system 104. An optional cone evacuation stage performs an optional fifth operation, interchangeably referred to herein a cone evacuation operation, wherein a filled and sealed cone is removed from a fourth one of the cone receptacles 110. At the conclusion of these operations, the cone filler control system 114 generates a carousel indexing signal that indexes the cone carousel 112 by one position. That is, the cone carousel 112 is rotated by one cone receptacle position such that each one of the cone receptacles 110 are rotated in a serial fashion through the cone loading stage, the cone filling stage, the optional tamping stage, the cone closing stage and the optional cone evacuation stage.

The illustrated portion of the auger load system 106 comprises an auger drive motor 120, a belt drive system 122, an auger shaft 124, and an auger 126. The auger load system 106 rotatably drives the auger 126 for a determined duration to dispense a predefined amount of the smokable material through a lower portion 128 of the hopper 116. The auger 126 extends through a hole (aperture) located at the lower portion 128 of the hopper 116. An outside diameter of the auger 126 is sized to fit through the hole, wherein a rim (edge) of the hole has a diameter that is slightly greater than the outside diameter of the auger 126. Accordingly, smokable material is not able to pass between the outside diameter of the edges of the helical screw blade of the auger 126 and the rim of the hole. However, the auger 126 is able to freely turn within the hole without any, or with very little, frictional resistance from the rim of the hole that the auger 126 extends through.

During operation, the control system 114 converts the user specified amount of smokable material received in the user input into a determined duration. The control signal is communicated from the cone filler control system 114. The belt drive system 122 couples a shaft 124 of the auger 126 to the auger drive motor. Actuation of the auger drive motor 120 for the determined duration, in response to the control signal, turns a belt of the belt drive system 122 so that the shaft 124 of the auger 126 rotates for the determined duration. The helical screw blade of the auger 126, as it is rotated for the determined duration, captures smokable material residing in the hopper 116. Rotation of the auger transports the captured smokable material downward and out through the lower portion 128 of the hopper 116. Accordingly, the helical screw blade of the auger 126 dispenses the user specified amount of smokable material out from the lower portion 128 of the hopper 116 into the empty cone. The captured smokable material is then transported downward by the movement of the helical screw blade of the auger 126, and is then dispensed out through the hole in the bottom of the hopper 116. The smokable material being dispensed from the hole of the hopper 116 is guided into a single cone residing in a cone receptacle 110 via a feed chute (not shown) that is oriented directly below the lower portion 128 of the hopper 116.

Figure 2:
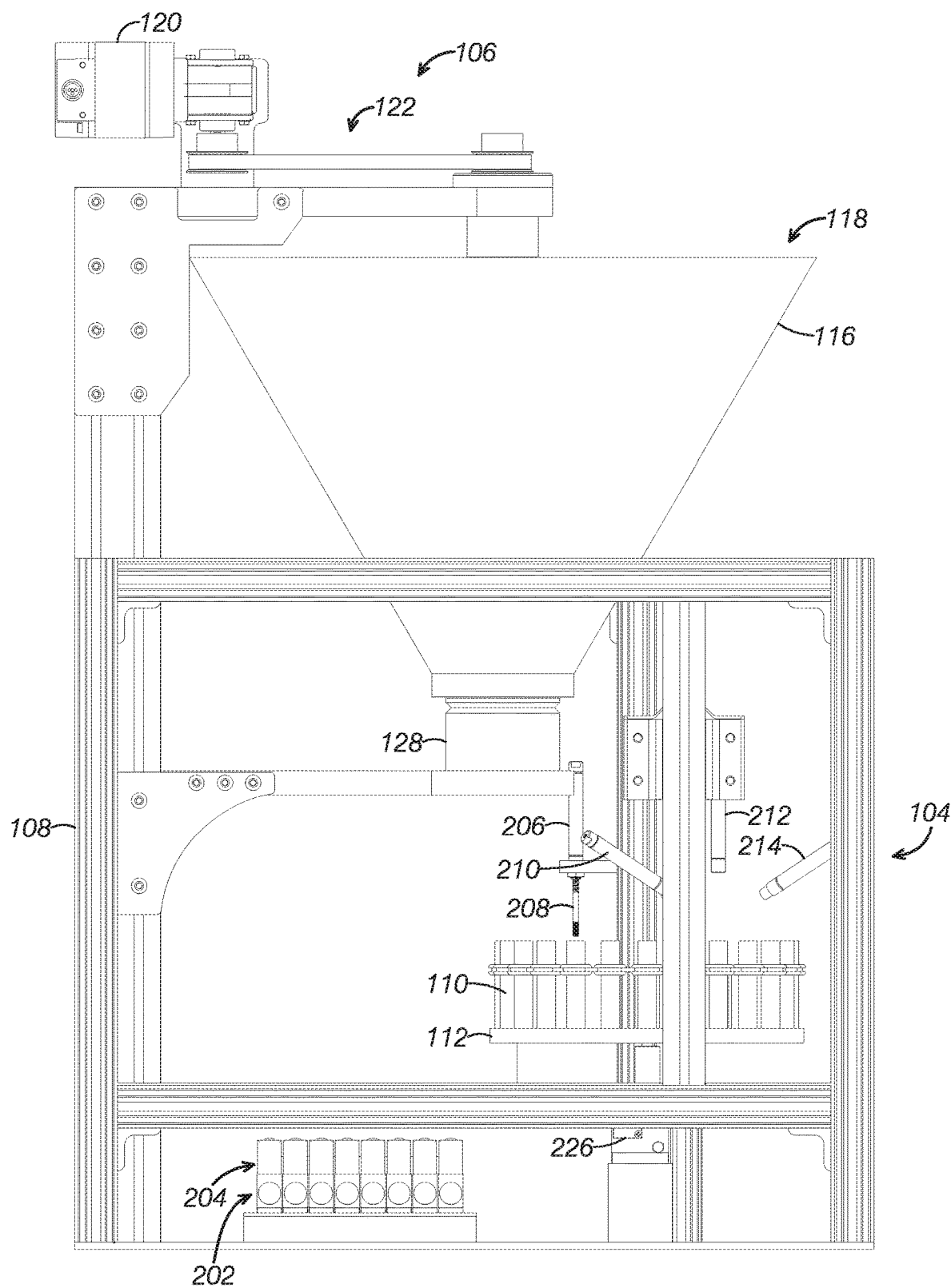
FIG. 2 is a side view of the example cone filling system.
Figure 3:
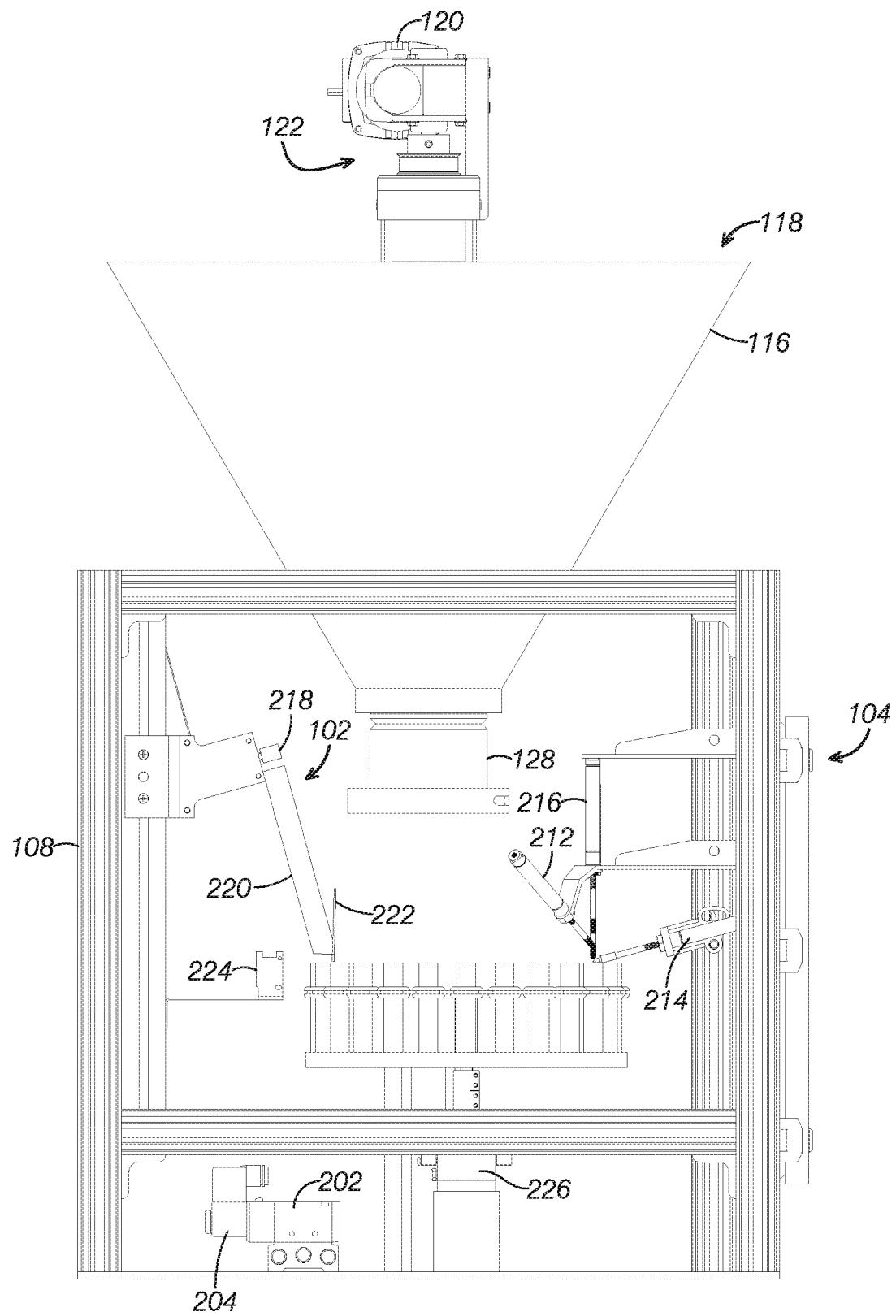
FIG. 3 is a front view of the example cone filling system.

FIG. 2 is a side view of the example cone filling system 100 showing additional detail of the cone top sealing system 104. FIG. 3 is a front view of the example cone filling system 100 showing additional detail of the cone dispenser system 102 and the cone top sealing system 104. FIG. 3 illustrates a portion of the cone dispenser system 102 (not visible in FIG. 2).

In a preferred embodiment, various components of the cone filling system 100 are driven using compressed air, nitrogen, or any suitable gas. In a preferred embodiment, a plurality of electronically driven solenoids 202 are communicatively coupled to the cone filler control system 114 using a suitable wire connector and/or a wireless connection (not shown). When selected ones of the solenoids 202 are actuated by a control signal generated by the cone filler control system 114, the actuated solenoid 202 moves a piston (not shown) in an air compressor unit 204. The compressed air expelled from the air compressor unit 204 is communicated through an air hose (not shown) to a corresponding pneumatic actuator. In alternative embodiments, one or more of the actuators may be a hydraulic actuator operated by a pressurized liquid or another suitable fluid. Alternatively, or additionally, one or more of the actuators may be an electrical actuator communicatively coupled to the cone filler control system 114 that are operated by using an electronic solenoid under the control of the cone filler control system 114.

An optional cone packer actuator 206 (omitted from FIG. 3), coupled to one of the air compressor units 204, is operable to extend a packing tool 208 downward onto a cone that has been previously filled by the auger load system 106. One or more repeated extensions of the packing tool 208 compresses the smokable material down into the filled cone. Then, the cone with the compressed smokable material is moved by the cone carousel 112 to the cone top sealing system 104. In the various embodiments, the packing tool 208 may be a pneumatic actuator, a hydraulic actuator, or an electronic solenoid.

In a preferred embodiment, the cone top sealing system 104 comprises three cone top closing actuators 210, 212, and 214. A cone top sealing actuator 216 (not visible in FIG. 2) is disposed directly above the cone that is being closed. In the various embodiments, the actuators 210, 212, 214, and/or 216 may be a pneumatic actuator (solenoid), a hydraulic actuator, or an electronic solenoid. In other embodiments, other numbers of cone top closing actuators may be employed to close and seal the top of a filled cone.

As described in greater detail herein, during an operation of a cone folding stage, the first cone top closing actuator 210 is actuated in response to a control signal issued from the cone filter control system 114 to extend a first closing head (not shown) on a downward slant onto the top of the open cone that has been filled with the smokable material. In a preferred embodiment, the slant angle is forty five degrees (45°). Any suitable slant angle may be used in the various embodiments as a matter of design choice. The extending first closing head of the first cone top closing actuator 210 folds a first portion of the cone top downward onto the top of the compressed smokable material. Then, after the first closing head of the first cone top closing actuator 210 has been retracted, the cone top sealing actuator 216 (in response to a control signal issued from the cone filter control system 114) extends a tamping head downward onto the partially folded cone top to secure the folded first portion of the cone top. Next, the second cone top closing actuator 212 is actuated (in response to a control signal issued from the cone filter control system 114) to extend a second closing head (not shown) on a downward slant onto the top of the open cone. The extending second closing head of the second cone top closing actuator 212 folds a second portion of the cone top downward onto the top of the compressed smokable material. Then, after the second closing head of the first cone top closing actuator 212 has been retracted, the cone top sealing actuator 216 (in response to a control signal issued from the cone filter control system 114) extends the tamping head downward onto the partially folded cone top to secure the folded first and second portions of the cone top. Next, the third cone top closing actuator 214 is actuated (in response to a control signal issued from the cone filter control system 114) to extend a third closing head on a downward slant onto the top of the open cone that has been filled with the smokable material. The extending closing head of the third cone top closing actuator 214 folds a third remaining portion of the cone top downward onto the top of the compressed smokable material. Then, after the third closing head of the first cone top closing actuator 214 has been retracted, the cone top sealing actuator 216 (in response to a control signal issued from the cone filter control system 114) extends the tamping head down onto the folded cone top to secure and seal the folded first, second, and third portions of the cone top. Depending upon the embodiment, the cone top closing actuators 210, 212, 214 and the cone top sealing actuator 216 may be actuated one or more times during the cone top closing process as needed to ensure that the cone top has been secured and sealed. At this juncture, the cone top has been closed, secured, and sealed by the cone top sealing system 104. One skilled in the art appreciates that the cone top closing actuators 210, 212, 214 may be actuated in a different order in alternative embodiments.

The portion of the cone dispenser system 102 illustrated in FIG. 3 comprises a roller 218, a cone chute 220, an optional cone backboard 222, and an optical sensor 224. As described in greater detail herein, during operation of a cone loading stage, the spinning roller 218 engages the lower end of an empty cone in a stack of cones, and moves the engaged empty cone downward into the cone chute 220. The empty cone is further moved downward to the end of the cone chute 220 and is directed into an empty cone receptacle 110 by the cone backboard 222.

The optical sensor 224 is coupled to the frame 108 at a location that is below the outlet end of the cone chute 220 and that is above a top of the cone receptacle 110 (wherein the cone receptacle 110 is directly below the outlet end of the cone chute 220). The field of view of the optical sensor 224 lies between the outlet end of the cone chute 220 and the top of the cone receptacle 110. Accordingly, the optical sensor 224 may sense presence or absence of a cone in the cone receptacle 110. If a cone is detected in the cone receptacle 110 by the optical sensor 224, the optical sensor 224 communicates a signal to the cone filler control system 114 so that the roller 218 is not actuated a second time so as to move another empty cone downward through the cone chute 220 (since there already is an empty or a full cone in the examined cone receptacle 110). Alternatively, after one or more puffs of air have been issued from the airline, and after a predefined duration without receiving the signal from the optical sensor 224, the cone filler control system 114 may actuate the roller drive motor a second time for the predefined duration or a different duration to dispense the leading cone which had failed to pass through the outlet of the cone stack feed tube 404 into the cone chute 220.

In the various embodiments, the cone carousel 112 is secured in a fixed position during the cone loading stage, the cone filling stage, the optional cone tamping stage, the cone folding stage, and the optional cone evacuation stage. The cone carousel 112 remains stationary until completion of the operations performed at all of the stages which are concurrently operating at their respective cone receptacle 110. After all stages have completed operation of their respective task, the cone carousel 112 is incrementally rotated by one cone receptacle 110 so that the following cone receptacle 110 is advanced by one stage position to a next stage (noting that at any given time, a plurality of the cone receptacles 110 are located in between stages due to special constraints in defining the location of the various stages in the frame 108). Then, the operation of the stages is again initiated by a global start cycle under the control of the cone filler control system 114.

A last step performed is to actuate a carousel indexing motor 226 that rotates the cone carousel 112 in a step-wise fashion by one cone receptacle 110. In an example embodiment, the carousel indexing motor 226 is an electric step function motor. Other types of motors may be used in alternative embodiments. For example, but not limited to, a pneumatic stepping actuator may be used to index the cone carousel 112.

Prior to operation of the cone filling system 100, the user adds a desired amount (quantity) of smokable material into the open end at the top portion 118 of the hopper 116. The processes of cone loading, cone filling, cone tamping, cone closing and/or cone evacuation may then commence. In embodiments that employ a cone evacuation process to remove filled and sealed cones from the cone carousel 112, the processes may run indefinitely so long as a sufficient amount of smokable material is in the hopper 116. When the cone filling system 100 is continuously operating, the user may add additional smokable material as needed to keep the hopper 116 filled. If a different type of smokable material is to be packed into cones, and/or if different sized or shaped cones are to be filled, the user may stop operation of the cone filling system to add a different type of smokable material and/or to add a different type of cone into the cone filling system 100. The process may then be re-initiated by the user by causing the processor to begin a new global start cycle.

Figure 4:
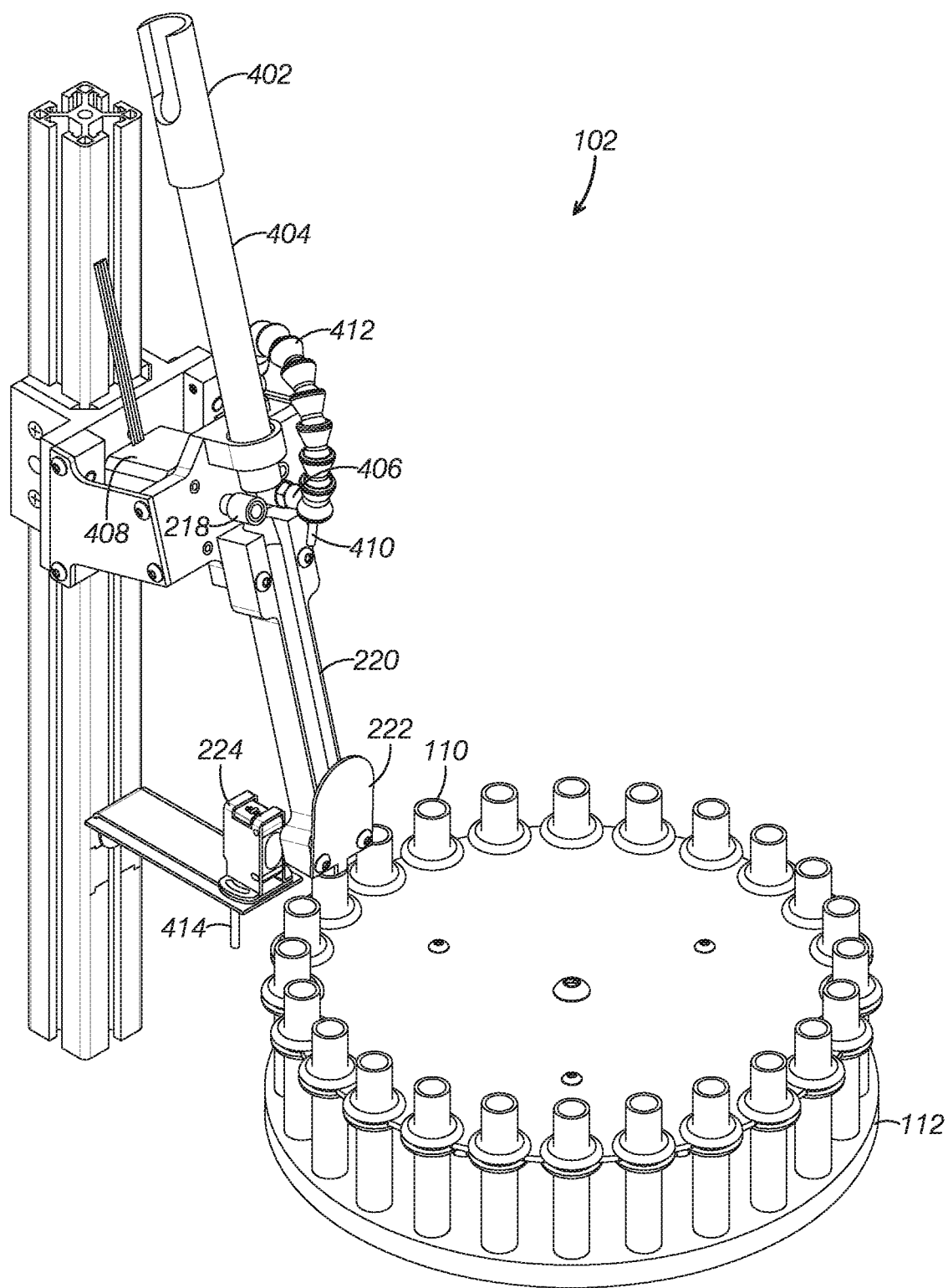
FIG. 4 is a perspective view of the cone dispenser system.
Figure 5:
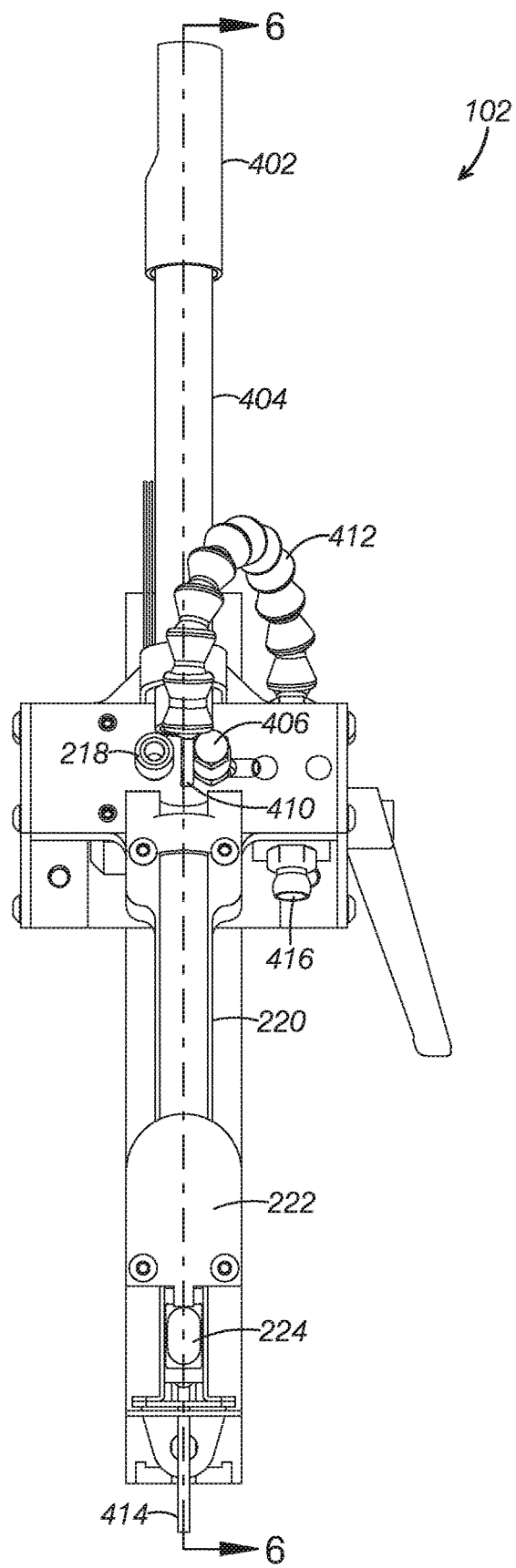
FIG. 5 is a front view of the cone dispenser system.
Figure 6:
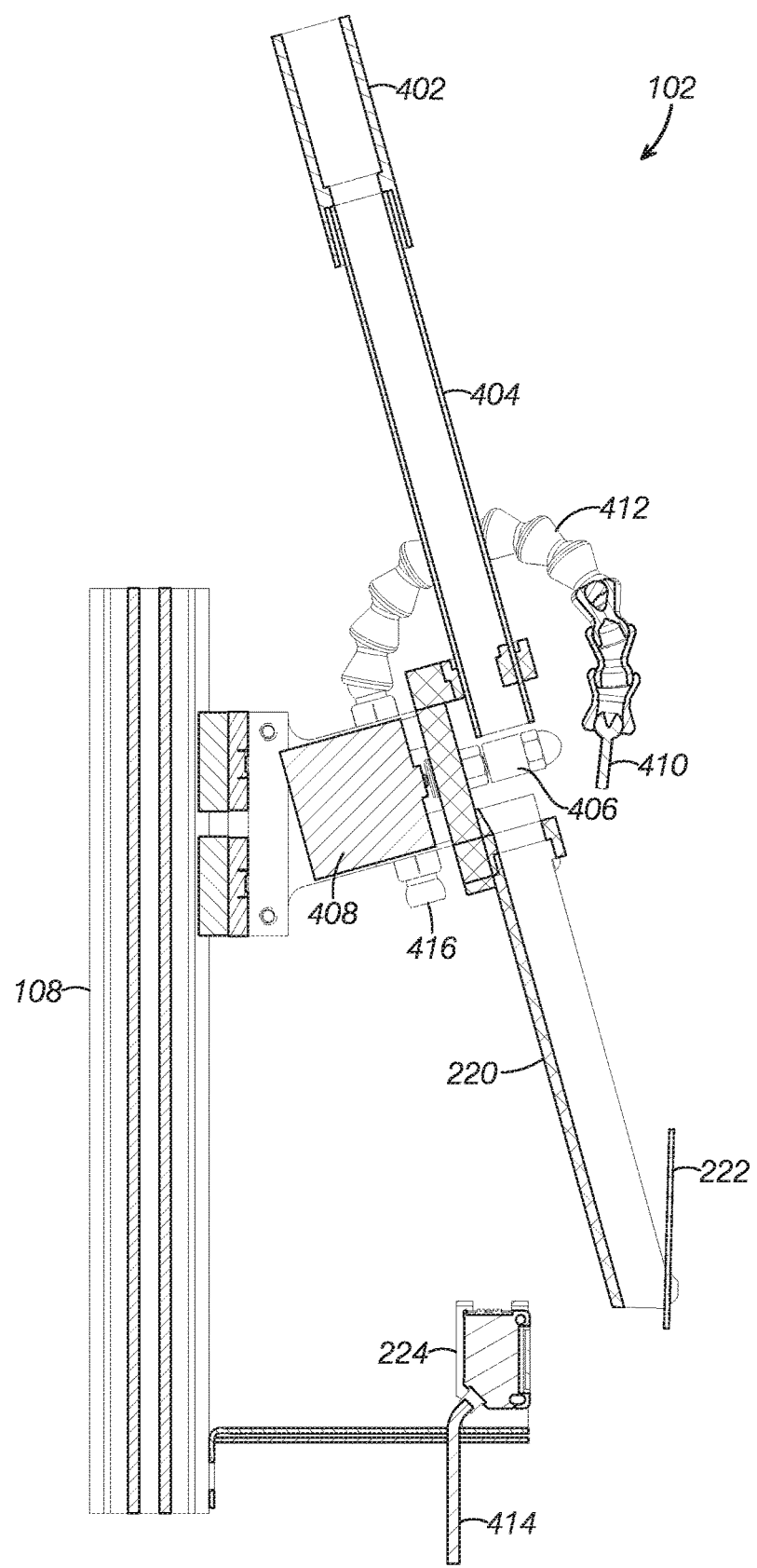
FIG. 6 is a cutaway side view of the cone dispenser system.

FIG. 4 is a perspective view of the cone dispenser system 102. FIG. 5 is a front view of the cone dispenser system 102. FIG. 6 is a cutaway side view of the cone dispenser system 102. The cone dispenser system 102 is secured to a portion of the frame 108 so as to be the first stage in the series of stages (the cone loading stage, the cone filling stage, the optional cone tamping stage, the cone folding stage, and the optional cone evacuation stage).

As described hereinabove, the cone dispenser system 102 comprises the roller 218, the cone chute 220, the optional cone backboard 222, and the optical sensor 224. The cone dispenser system 102 further comprises a cone infeed 402, a cone stack feed tube 404, an idling roller 406, a roller drive motor 408, an air nozzle 410, and an air line 412.

The upper inlet end of the cone infeed 402 is configured to receive a stack of cones manually inserted by a user. The lower outlet of the cone infeed tube is coupled to an inlet of the cone stack feed tube 404. In some embodiments, the inlet of the cone infeed 402 is configured to receive a plurality of different sized and shaped cones in a cone stack. In another embodiment, a plurality of different cone infeeds 402 are configured to receive a unique stack of cones having a unique shape and size. The plurality of different cone infeeds 402 are removably and/or slidably coupled to the inlet of the cone stack feed tube 404.

The roller 218 and the idling roller 406 are secured to the frame 108 immediately below the lower outlet of the cone stack feed tube 404. An inlet of the cone chute 220 is secured to the frame 108 directly below the roller 218 and the idling roller 406. The lower outlet of the cone chute 220 is located above one of the cone receptacles 110 such that a single dispensed cone slides down the cone chute 220, exits out of the outlet of the cone chute 220, and then enters into the empty cone receptacle 110. In an example embodiment, the back board 222 is secured to a portion of the outlet of the cone chute 220.

In practice, a plurality of stacked preformed cones are inserted into an inlet of the cone infeed 402 with the narrow bottom of the cone inserted first. The outlet of the cone infeed 402 is removably connected to an inlet of the cone stack feed tube 404. Gravity moves the stack of cones in a downward direction.

The gravity then slides the inserted stack of preformed cones down to the outlet at the bottom of the cone stack feed tube 404. The narrow bottom of the leading cone in the stack of preformed cones reaches the bottom of the cone stack feed tube 404 and then slides downward between the roller 218 and the idling roller 406. The non-rotating roller 218 and the idling roller 406 are adjacent to each other and are spaced apart by a predefined distance so as to let the narrow bottom of the cone fall between the roller 218 and the idling roller 406. The outward expanding mid-section of the engaged leading cone, which is at some point is wider that the separation distance between the roller 218 and the idling roller 406, frictionally engages the fixed roller 218 (non-rotating) such that the lower portion of the leading cone becomes fractionally secured by the roller 218 and the idling roller 406. Since the roller 218 is not being driven by the roller drive motor 408, the leading cone is not able to slide out from and exit the outlet of the cone stack feed tube 404. That is, the stationary roller 218 frictionally engages and secures the widened portion of the cone and thereby holds the cone securely in place.

The cone infeed 402, in a preferred embodiment, is configured to receive a plurality of different shaped and sized stacks of preformed cones. In an alternative embodiment, a plurality of different sized and shaped cone infeeds 402 are each configured to receive a particular shape and size of stacked preformed cones. The user may select the desired cone infeed 402 that is suitable for the particular type of cone that is to be filled with smokable material, and then secure the selected cone infeed 402 onto the top of the cone stack feed tube 404. Further, a plurality of different diameter cone stack feed tubes 404 may be interchangeable with each other so that different sized cones can be dispensed.

The cone chute 220, in a preferred embodiment, is configured to receive a plurality of different shaped and sized cones. In an alternative embodiment, a plurality of different sized and shaped cone chutes 220 are each configured to receive a particular shape and size of cones. The user may select the desired cone chute 220 that is suitable for the particular type of cone that is to be filled with smokable material, and then secure the selected cone chute 220 onto the frame 108.

At the start of the cone loading stage, which is initiated at the beginning of the global start cycle, the cone filler control system 114 actuates the roller drive motor 218 for some predefined duration that is sufficient to draw a single cone from the bottom of the cone stack feed tube 404. As the roller 218 is rotatably driven for the predefined duration by the roller drive motor 408, the ejecting cone is in frictional contact with the roller 218 and the idling roller 406. The idling roller 406 freely spins as the roller 218 drives the cone downward into the top of the cone chute 220. After the cone filler control system 114 has actuated the roller drive motor 408 for a predetermined duration (period of time) that is known to be sufficient to eject (discharge) a single cone from the bottom of the cone stack feed tube 404 into the top of the cone chute 220, the cone filler control system 114 ends actuation of (deactivates) the roller drive motor 408. That is, the rotation of the roller 218 ceases so that the next cone in the stack of cones is frictionally secured by the roller and is prevented from exiting the cone stack feed tube outlet. The bottom end of the next cone then drops downward in between the stationary roller 218 and the idling roller 406, and is held in place by the stationary roller 218 until the initiation of the next cone loading stage. That is, the roller 218 that is fixed in the stationary position prevents a next cone from exiting the outlet end of the cone feed stack tube 404.

In an alternative embodiment, the idling roller 406 is replaced by a second roller 218 that is driven by the roller drive motor(s) 408. In an example embodiment, the roller drive motor 408 drives both rollers. In another example embodiment, a second roller drive motor 408 drives the second roller. The two rollers 218 are both driven under the control of the cone filler control system 114 to cooperatively dispense a single cone from the bottom of the cone stack feed tube 404 downward into the top of the cone chute 220 when the two rollers are driven for the predefined duration. After the leading cone has been ejected from the cone stack feed tube 404, the bottom end of the next cone then drops down in between the stationary rollers 218 and is held in place by the stationary rollers 218 until the initiation of the next cone loading stage.

The cone filler control system 114 further actuates a selected one of the solenoids 202 to cause an air compressor unit 204 coupled to an inlet 416 of the airline 412 to issue one or more puffs of air out from the downwardly oriented air nozzle 410. Preferably, the puff of air is initiated after the leading cone has been ejected from the bottom of the cone stack feed tube 404 into the top of the cone chute 220 by the roller 218. The one or more puffs of air propel the single cone downward through the cone chute 220 towards an empty cone receptacle 110 that is positioned below the end of the cone chute 220. The leading end of the cone then enters into the top of the empty cone receptacle 110. The optional backboard 222 may facilitate directing and/or guiding the leading narrow end of the cone into the opening of the empty cone receptacle 110. Then, in some embodiments, a final puff of air is used to securely seat the cone into the cone receptacle 110.

During the cone loading stage, the optical sensor 224 is optically sensing the presence or absence of a cone in the cone receptacle 110 that is positioned below the lower end of the cone chute 220. The optical sensor communicates a signal to the cone filler control system 114 indicating the presence or absence of a cone in the cone receptacle 110 that is immediately below the outlet of the cone chute 220. If no cone is present, a corresponding signal may be issued by the optical sensor 224 to the cone filler control system 114, the cone filler control system 114 may initiate the cone loading stage. In an alternative embodiment, the absence of a signal from the optical sensor 224 may indicate that the cone receptacle 110 is empty.

After a cone has been seated into the cone receptacle 110, the optical sensor 224 senses the presence of the newly seated and empty cone in the cone receptacle 110. The optical sensor then communicates a signal to the cone filler control system 114 indicating that the cone is now in the cone receptacle 110. The cone filler control system 114 may then determine that the cone loading stage has been completed. In an example embodiment, the air compressor unit is optionally actuated, in response to receiving the signal from the optical sensor indicating that the leading cone is in the cone receptacle 110, a second time to emit gas from the nozzle a second time to seat the leading cone into the cone receptacle.

Alternatively, if the optical sensor 224 does not detect that the cone has been seated in the cone receptacle 110, the cone filler control system 114 may determine that the cone loading stage has not completed. Here, the cone filler control system 114 may generate further puffs of air to force the cone that may be stuck in the cone chute 220 downward into the opening of the cone receptacle 110. That is, in response to receiving the signal from the optical sensor indicating that the leading cone is in the cone receptacle 110, the air compressor unit is actuated a second time to emit gas from the nozzle a second time to further propel the leading cone down through the cone chute into the empty cone receptacle.

In some situations, as the cone carousel 112 is advanced by one position, a cone may already be present in the cone receptacle 110 that is moved into position below the lower end of the cone chute 220. Is in this situation, the optical sensor 224 detects the presence of a filled or unfilled cone. The optical sensor communicates a signal to the cone filler control system 114 that indicates the detected presence of the cone in the cone receptacle 110. In response to receiving the signal from the optical sensor 224 indicating presence of a detected cone, the cone filler control system 114 does not initiate the start of the cone loading stage. That is, the cone filler control system 114 does not actuate the roller drive motor 408. The cone filler control system 114 may then temporarily halt the cone loading stage and/or the other stages, and issue an error warning or the like to the user so that the user may investigate the situation and/or remove the detected cone. For example, a filled cone may have failed to have been evacuated from the cone receptacle 110. Accordingly, the non-evacuated cone remaining in the cone receptacle 110 would be detected by the optical sensor 224, thus preventing the loading of an empty cone into the otherwise occupied cone receptacle 110.

In some situations when the optical sensor may detect that a cone that has not been seated into the cone receptacle 110. Here, the cone filler control system 114 may determine that the cone may not have been successfully drawn out through the bottom of the cone stack feed tube 404. The cone filler control system 114 may then further actuate the roller drive motor 408 a second time for the predefined duration, or a different predefined duration, to finish expelling the leading cone out from the end of the cone stack feed tube 404 and down into the cone chute 220 so as to seat the cone in the cone receptacle 110.

In other situations when the optical sensor has not detected a cone that has been seated into the cone receptacle 110, the cone filler control system 114 may then temporarily delay the next global start cycle, and issue an error warning or the like to the user so that the user may investigate the situation. For example, the cone stack feed tube 404 may be empty, thereby requiring the user to add more cones into the cone infeed 402 to fill the cone stack feed tube 404 with new cones.

As described herein, the cone carousel 112 is incrementally rotated so that the cone receptacles 110 each pass through the cone loading stage, the cone filling stage, the optional cone tamping stage, the cone folding stage, and the optional cone evacuation stage. If during the initiation of the stages an empty cone carousel 112 has been placed into the cone filling system 100, the optical sensor will repeatedly detect empty cone receptacles 110 as they are advanced through the various stages. At some juncture, the first cone receptacle 110, now occupied with a filled and sealed cone, will rotate into the position in front of the optical detector 224. The optical detector 224 will send a signal to the cone filler control system 114 indicating that the filled and sealed cone has been detected. The cone filler control system 114 then ends the cone filling process and issues a message or the like to the user indicting that the cone carousel 112 is now filled with filled and sealed cones. Then, the user may remove and/or empty the cone carousel 112. Alternatively, with embodiments equipped with a cone evacuation system (not shown), the cone filling system can continuously operate to fill cones with the smokable material.

In the example illustrated embodiment, the optical sensor 224 is communicatively coupled to the cone filler control system 114 via a wire-based connector 414. An alternative embodiment may communicatively couple the optical sensor 224 to the cone filler control system 114 using a suitable wireless signal.

In a preferred embodiment, the air line 412 is a section of an adjustable lock air line with the air nozzle 410 coupled to one end of the air line 412. During set up, the adjustable lock airline may be conveniently positions and oriented to provide one or more downward directed puffs of air to force the leading coned down through the cone chute 220 and then into an empty cone receptacle 110. The opposing end of the adjustable lock air line 412 is coupled to an air line inlet 416 that is configured to be secured to the end of a flexible air line hose.

The opposing end of the air line 412 is coupled to one of the air compressor units 204. When the associated solenoid 202 is actuated by the cone filler control system 114 for a short predefined duration, the generated compressed air is expelled out as a puff of air through the air nozzle 410. In an alternative embodiment, any suitable air line 412 may be used. In some embodiments, the opposing end of the airline 412 is coupled directly to the air compressor unit 204.

In some embodiments, multiple air lines 412 (each with nozzles 410) may be positioned and oriented downward at various locations along the cone chute 220 to facilitate transport of a cone through the cone chute 220 and/or to seat the cone into the cone receptacle 110. For example, the cone filler control system 114 may serially actuate a plurality of solenoids 202 to cause corresponding air compressor units 204 to sequentially emit puffs of gas through the air nozzles 410 of the multiple air lines 412. The timing of the puffs of air out of each of the series of multiple air lines 412 may be arranged so as to advance a cone down through the cone chute 220 and into a cone receptacle 110.

Any suitable diameter and/or material of the roller 218 and the idling roller 406 may be used in the various embodiments. The diameters of the roller 218 and the idling roller 406 may be different. Further, in some embodiments, the position of one or both of the roller 218 and the idling roller 406 may be adjustable so that the separation distance between the roller 218 and the idling roller 406 can be adjusted to accommodate various sizes of cones.

Figure 7:
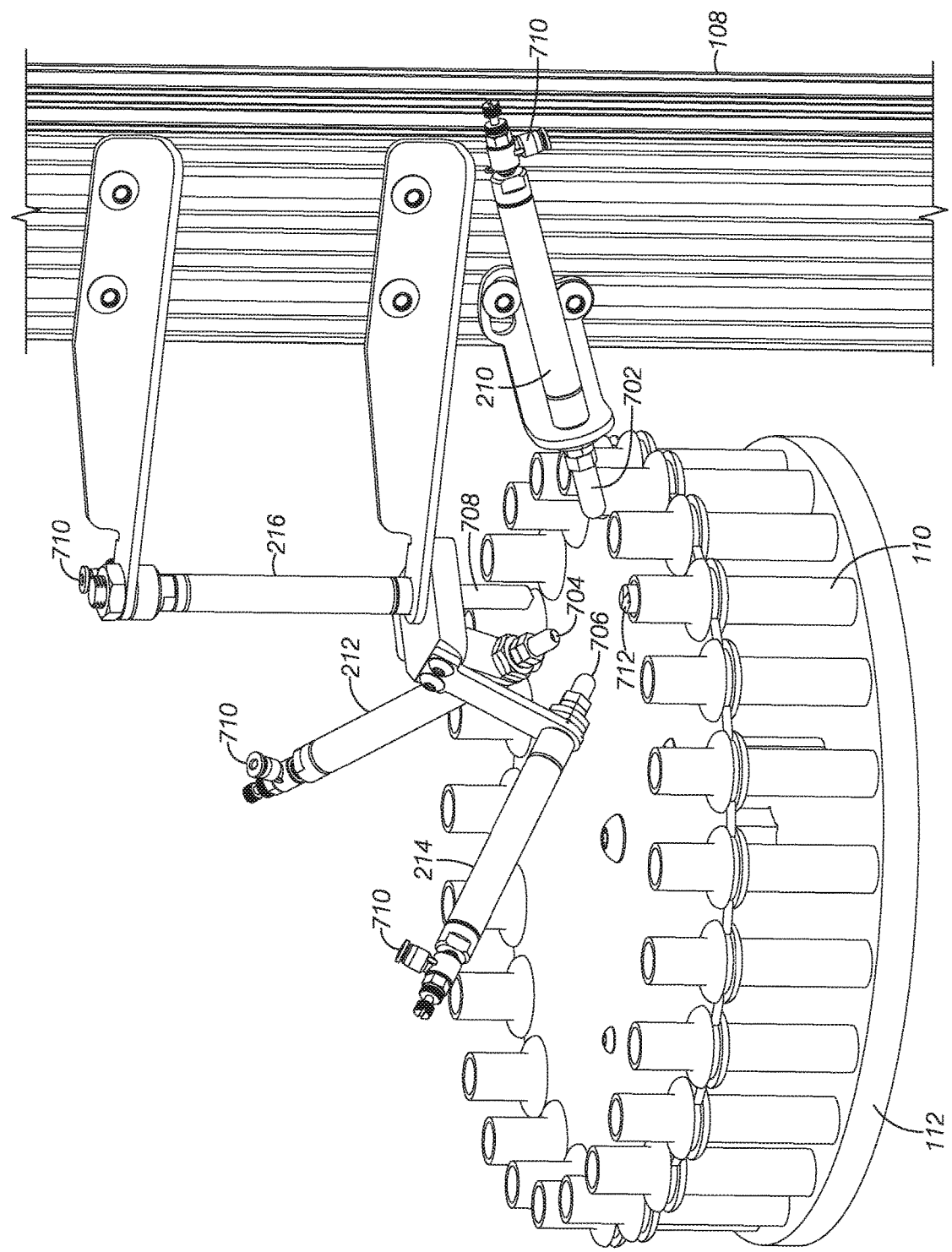
FIG. 7 is a perspective view of the cone top sealing system.

FIG. 7 is a perspective view of the cone top sealing system 104. The cone top sealing system 104 comprises a first cone top closing actuator 210, a second cone top closing actuator 212, a third cone top closing actuator 214, and a cone top sealing actuator 216. Each of the cone top closing actuators 210, 212, 214 are configured to fold down a portion of the top of a cone that has been filled with the smokable material. The cone top sealing actuator 216 is configured to tamp down and secure each folded portion of the top of the cone. The three cone top closing actuators 210, 212, 214 are oriented in a downward slanting position that is directed towards the filled cone that is to be closed and sealed. The cone top sealing actuator 216 is pointed downward and is located directly above the filled cone that is to be closed and sealed.

In a preferred embodiment, each of the cone top closing actuators 210, 212, 214 are pneumatic actuators that extend a closing head 702, 704, and 706, respectively, that sequentially engages and then pushes down a portion of the cone top down onto the top of the filled cone. The cone top sealing actuator 216 is a pneumatic actuator that extends a sealing head 708 downward onto the top of the filled cone that is being closed. Each of the actuators 210, 212, 214, 216 have an air inlet 710 that is coupled to an air line (not shown) that extends back to and that is coupled to an air compressor unit 204.

In a non-limiting example embodiment, the closing heads 702, 704, and 706 are shallow conical shaped heads. In some embodiments, an optional through hole (aperture) is bored or fabricated into the center of the closing head 702, 704, and 706 to facilitate attachment of the head to a shaft that is extended and retracted by the cone top closing actuators 210, 212, 214. Further, the rim edges of the hole improve the fold being made to the top of the cone that is being closed.

The sealing head 708 may be similarly shaped as the closing heads 702, 704, and 706. Alternatively, the sealing head 708 may be flat or substantially flat. Alternatively, or additionally, the sealing head 708 may include a small point or the like that improves the sealing of the folds made to the top of the cone that is being closed.

When the cone filler control system 114 actuates the solenoid 202 of a particular one of the air compressor units 204, that respective actuator 210, 212, 214, 216 extends its head down onto the filled cone that is to be closed. Here, the air compressor communicates pressurized air to its connected actuator 210, 212, 214, 216. The actuators 210, 212, 214, 216 are piston-like actuators, wherein the compressed air pushes the head outwardly from the actuator. A spring or other retaining device retracts the extended head after the head has completed its folding or tamping operation. Alternatively, or additionally, the air compressor unit may be actuated to generate a suction (negative air pressure) that retracts the head back into the actuator. In alternative embodiments, the actuators 210, 212, 214, 216 may be a hydraulic actuator and/or an electronic solenoid that is configured to extend and retract its respective head.

To conceptually disclose operation of the cone folding stage, a closed and sealed cone 712 is illustrated in the cone receptacle 110 of FIG. 7. Here, three folds are visible on the top of the closed and sealed cone 712. FIG. 7 further illustrates that the heads 702, 704, 706, and 708 are retracted into their respective actuator 210, 212, 214, 216.

The cone folding operation commences after the global start cycle is initiated by the cone filler control system 114. In an example embodiment, the global start cycle begins with a step-wise actuation of the carousel indexing motor 226 to advance the cone carousel 112 by one cone receptacle position. In the illustrated embodiment, the cone carousel 112 is rotated in a clockwise direction. (In other embodiments, the carousel indexing motor 226 is actuated after all stages have completed their respective tasks.)

Figure 8:
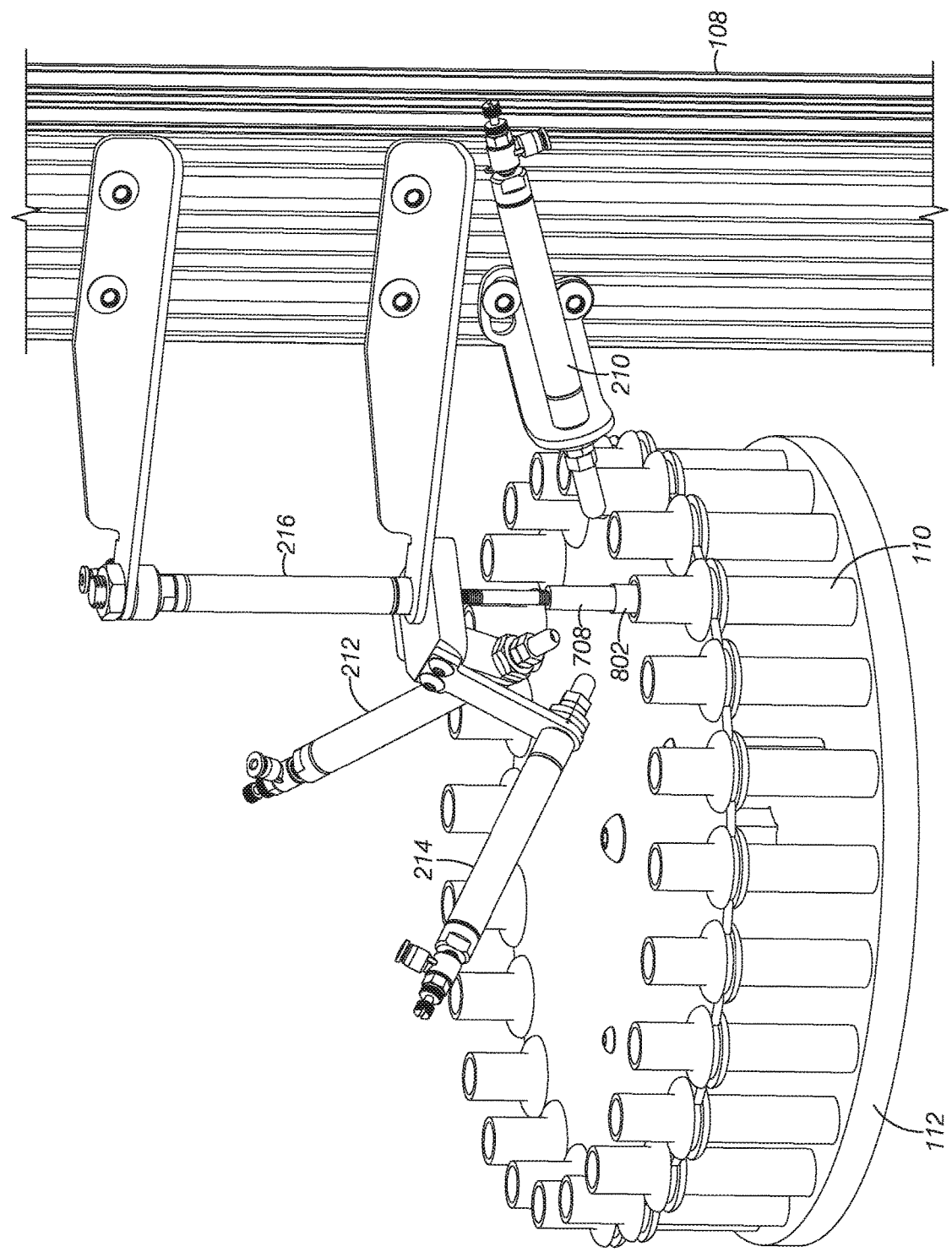
FIG. 8-11 illustrate example steps in a cone closing operation.

FIG. 8 illustrates an example first step in a cone closing operation. To initiate the cone folding stage in a preferred embodiment, the cone filler control system 114 actuates one of the solenoids 202 to cause the corresponding air compressor unit 204 that is coupled to the cone top sealing actuator 216 to generate pressurized air that extends the cone sealing head 708 to move downward onto the top of the smokable material on the top of the cone that is to be closed. This optional first step packs down the smokable material into the cone that is to be closed. Here, the cone sealing head 708 is illustrated as being extended downward into the open top 802 of the open cone. The tamping process may be performed any desired number of times by the cone filler control system 114 by retracting the sealing head 708, and then again actuating the solenoid 202 to cause the cone sealing head 708 to again extend down onto the top of the smokable material. In embodiments that include the optional cone packer actuator 206, this tamping step may be omitted. The first tamping step concludes with a final retraction of the cone sealing head 708 into the cone top sealing actuator 216.

Figure 9:
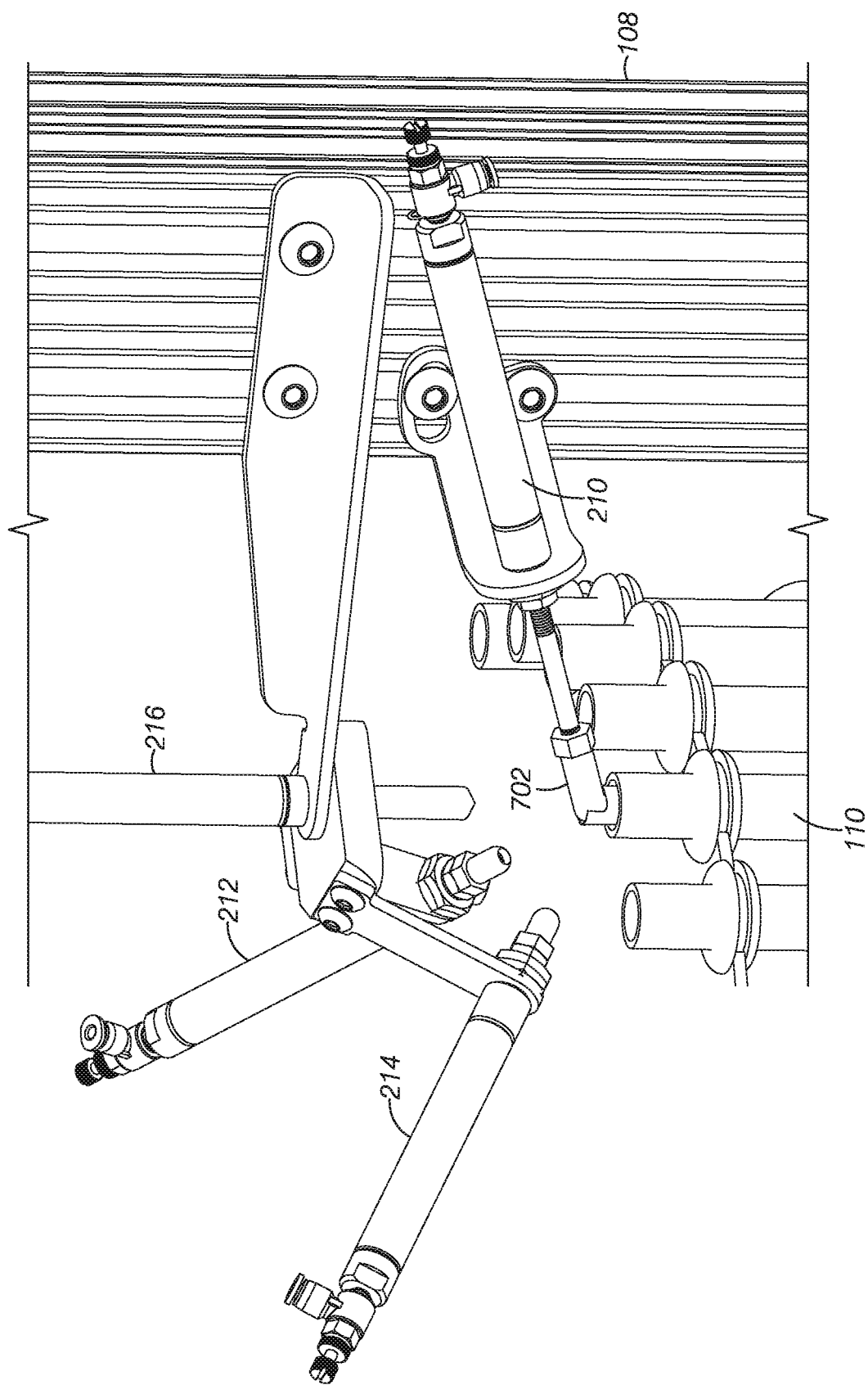

FIG. 9 illustrates second step in the clone closing operation. Here, the cone filler control system 114 actuates one of the solenoids 202 to cause the corresponding air compressor unit 204 that is coupled to the first cone top closing actuator 210 to generate pressurized air that extends the first cone closing head 702 to move downward onto the top 802 of the cone that is to be closed. The first cone closing head 702 pushes a first portion of the top 802 of the cone downward onto the top of the tamped smokable material as illustrated in FIG. 9. Some embodiments may optionally repeat the folding operation a plurality of times by retracting and then extending the first cone closing head 702 to ensure that a "good" first fold has been made to the cone top. The second step concludes with a final retraction of the first cone closing head 702 into the first cone top closing actuator 210.

Next, in a preferred embodiment, the cone filler control system 114 actuates the solenoid 202 coupled to the cone top sealing actuator 216 to cause the corresponding air compressor unit 204 to generate pressurized air that extends the cone sealing head 708 to move downward onto the first fold in the top 802 of the cone that is to be closed. Some embodiments may omit this step. This optional step secures the first fold down onto the top of the cone that is to be closed.

Figure 10:
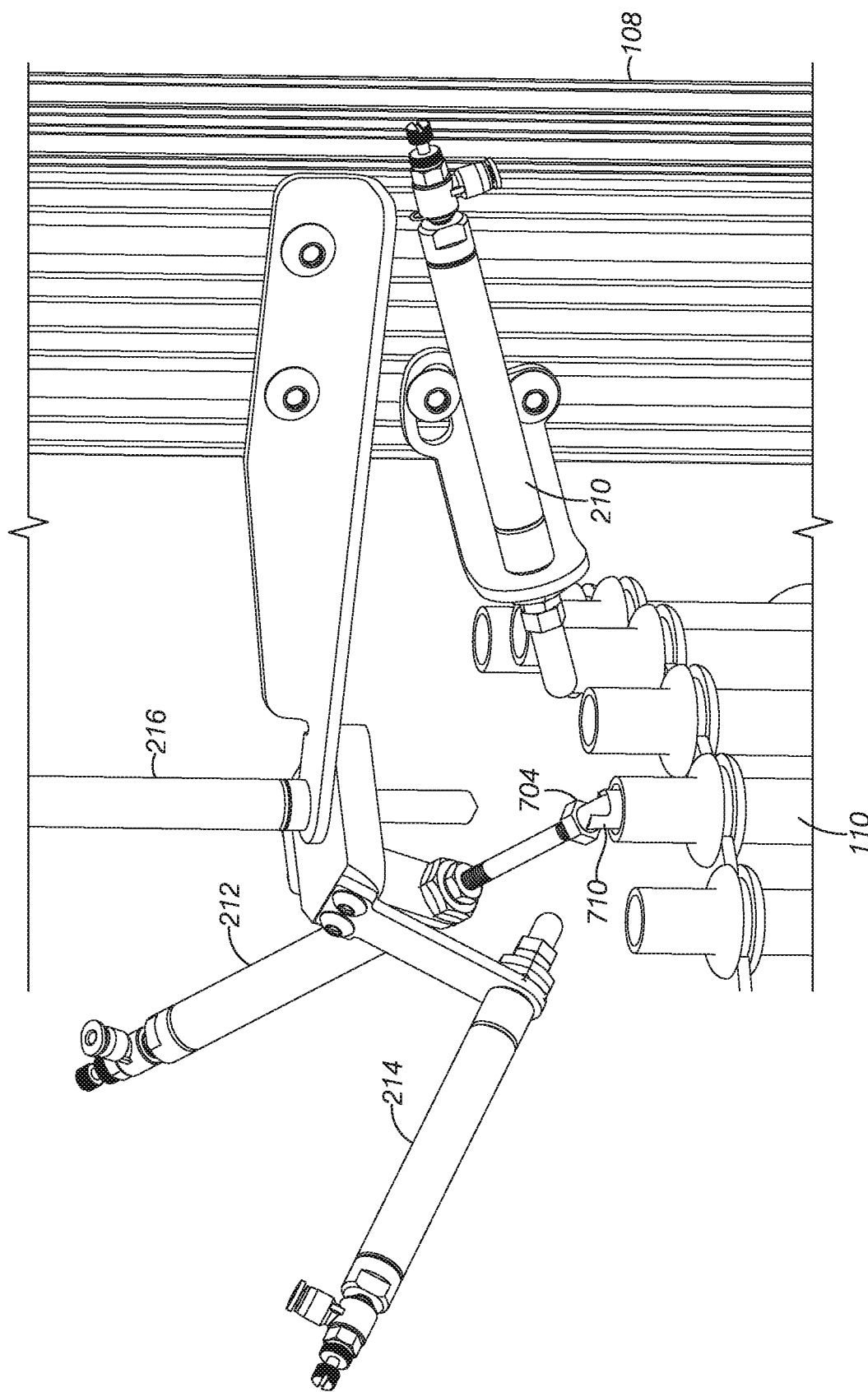

FIG. 10 illustrates a next step in the clone closing operation. Here, the cone filler control system 114 actuates one of the solenoids 202 to cause the corresponding air compressor unit 204 that is coupled to the second cone top closing actuator 212 to generate pressurized air that extends the second cone closing head 704 to move downward onto the top 802 of the cone that is to be closed. The second cone closing head 704 pushes a second portion of the top 802 of the cone downward onto the top of the tamped smokable material as illustrated in FIG. 10. Some embodiments may optionally repeat the folding operation a plurality of times by retracting and then extending the second cone closing head 704 to ensure that a "good" second fold has been made to the cone top. This step concludes with a final retraction of the second cone closing head 704 into the second cone top closing actuator 212.

Next, in a preferred embodiment, the cone filler control system 114 again actuates the solenoid 202 coupled to the cone top sealing actuator 216 to cause the corresponding air compressor unit 204 to generate pressurized air that extends the cone sealing head 708 to move downward onto the first fold and the second fold in top 802 of the cone that is to be closed. Some embodiments may omit this step. This optional step secures the first fold and the second fold down onto the top of the cone that is being closed.

Figure 11:
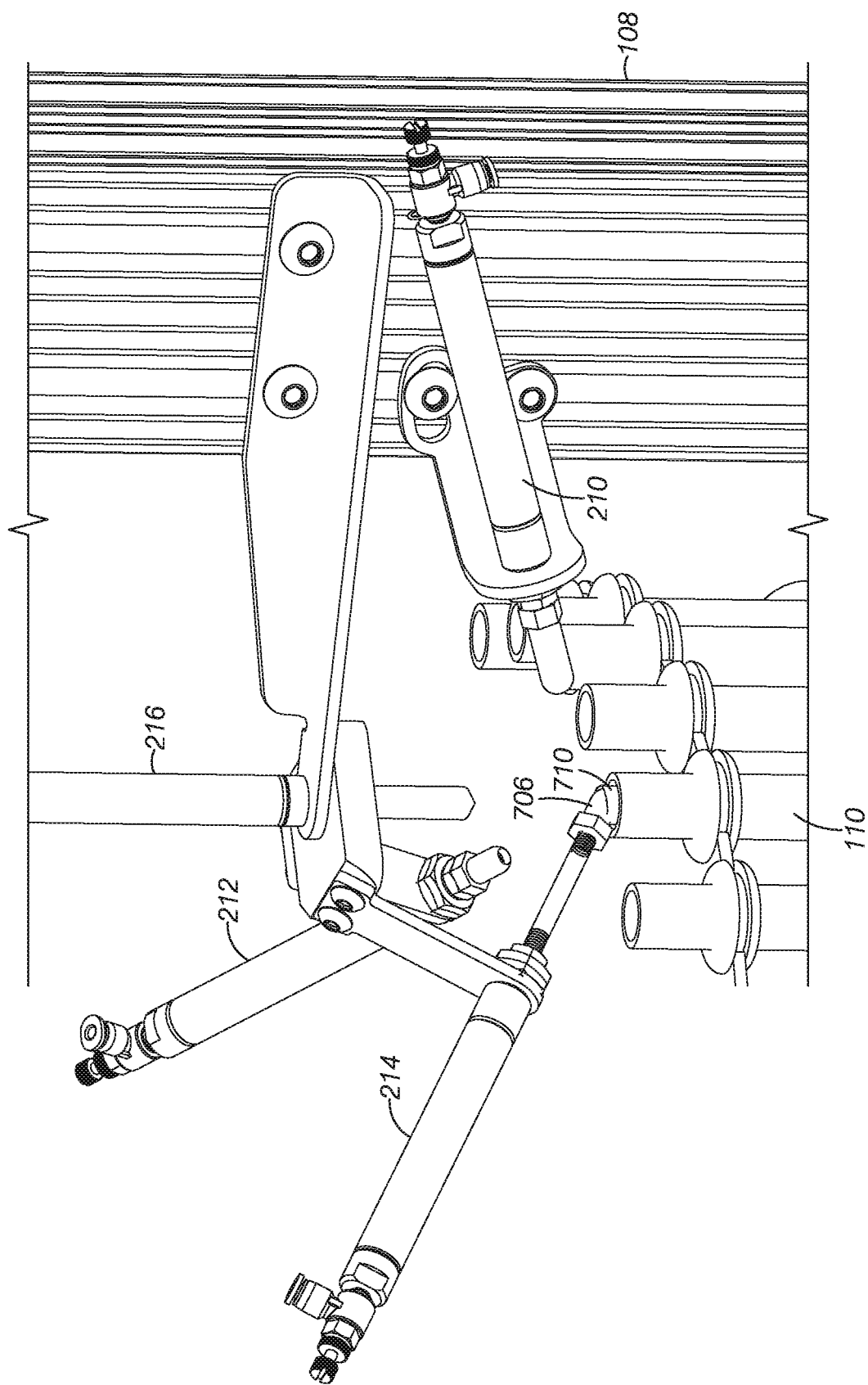

FIG. 11 illustrates a next step in the clone closing operation. Here, the cone filler control system 114 actuates one of the solenoids 202 to cause the corresponding air compressor unit 204 that is coupled to the third cone top closing actuator 214 to generate pressurized air that extends the third cone closing head 706 to move downward onto the top 802 of the cone that is to be closed. The third cone closing head 706 pushes a third and last portion of the top 802 of the cone downward onto the top of the tamped smokable material as illustrated in FIG. 11. Some embodiments may optionally repeat this folding operation a plurality of times by retracting and then extending the third cone closing head 706 to ensure that a "good" third fold has been made to the cone top. This step concludes with a final retraction of the third cone closing head 706 into the third cone top closing actuator 214.

Next, in a preferred embodiment, the cone filler control system 114 actuates the solenoid 202 coupled to the cone top sealing actuator 216 to cause the corresponding air compressor unit 204 to generate pressurized air that extends the cone sealing head 708 to move downward onto first, second, and third folds in the top 802 of the cone that is to be closed. Some embodiments may omit this step. This optional step secures the three folds down onto the top of the cone that is being closed.

At this juncture, after the cone top has been closed and sealed, the cone closing stage has been completed. Because the cone filler control system 114 is controlling the above-described cone closing steps, the cone filler control system 114 determines when the clone closing stage has been completed.

Figure 12:
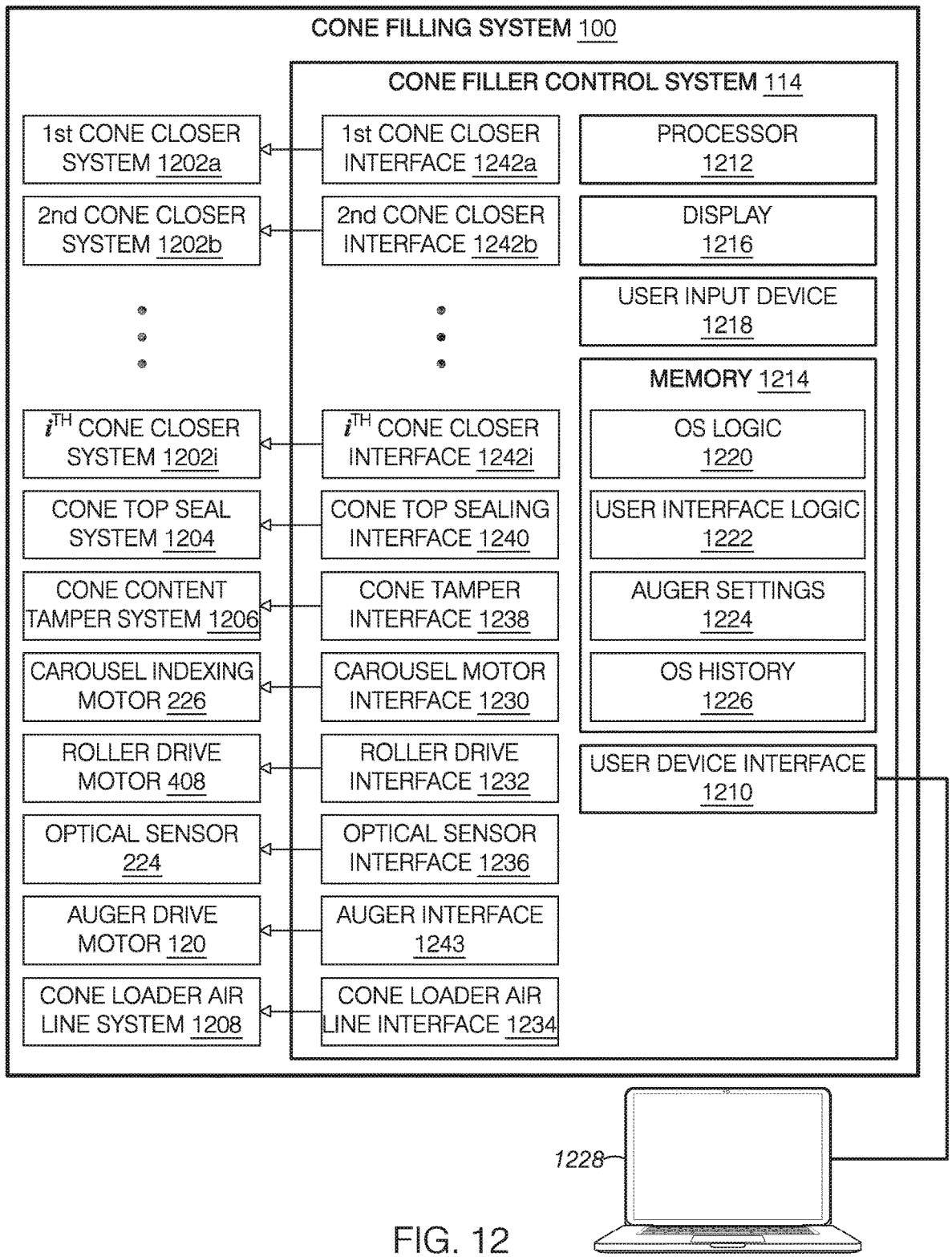
FIG. 12 is a block diagram of an example embodiment of the cone filling system.

FIG. 12 is a block diagram of an example embodiment of the cone filling system 100. The non-limiting exemplary cone filling system 100 comprises the cone filler control system 114, the auger drive motor 120, the roller drive motor 408, the optical sensor 224, a carousel indexing motor 226, a plurality of cone closer systems 1202a, 1202b and 1202i, a cone top seal system 1204, a cone content tamper system 1206, and a cone loader airline system 1208. The cone filler control system 114 comprises a user device interface 1210, a processor 1212, a memory 1214, an optional display 1216, a user input device 1218, and a plurality of interfaces (described hereinbelow). The memory 1214 comprises portions for storing the operating system (OS) logic 1220, the user interface logic 1222, the auger settings 1224, and the operating system (OS) history 1226. In some embodiments, the OS logic 1220 and the user interface logic 1222 may be integrated together, and/or may be integrated with other logic. In other embodiments, some or all of these memory and other data manipulation functions may be provided by using a remote server or other electronic devices suitably connected via the Internet or otherwise to a client device. Other cone filling systems 100 may include some, or may omit some, of the above-described media processing components. Further, additional components not described herein may be included in alternative embodiments.

In operation, the user provides setting information to the cone filler control system 114 by providing manual user input via the user input device 1218. The user input device 1218 may be a touch screen display (integrated into the display 1216), a keyboard device, and/or a plurality of controllers (buttons, switches, toggles, or the like). Alternatively, or additionally, the user may communicatively couple a computer, lap top, notebook, smart phone, or other electronic device 1228 to the cone filler control system 114 via the user device interface 1210 using a suitable wire-based or wireless connection.

The processor system, executing the user interface logic 1222, receives the user input and determines a plurality of user settings that control operation of the cone filling system 100. For example, the user may specify a particular amount of smokable material that is to be placed into each cone as the cone is being filled. The processor 1212 then determines how long the auger drive motor 120 is to be actuated so as to turn the auger 126 for some predefined duration. By turning the auger 126 by the determined duration, the rotating auger adds some corresponding amount of smokable material into a cone. Here, one skilled in the arts appreciates that rotation of the auger 126 for some per unit of time pushes a known amount of smokable material through the auger 126 and out of the lower end 128 of the cone 116. Other user commands may be similarly specified by the user. These determined user commands may be stored into the auger settings 1224 portion of memory 1214.

Based on the user setting information, the processor 1212, executing the OS logic 1220, can then begin the process of filling cones with smokable material. As described herein, the empty receptacles 110 of the cone carousel 112 are rotated in an incremental step-wise fashion from the cone loading stage to the cone filling stage, to the optional cone tamping stage, to the cone folding stage, and finally to the optional cone evacuation stage. Accordingly, for each stage increment, the processor 1212 retrieves specific information for loading cones, filing cones, tamping cones, folding cones, and evacuating cones from the memory 1214.

The process of loading cones is made in response to a user start command received at the user device interface 1210 or the user input device 1218. The processor 1212, executing the OS logic 1220 and the user interface logic 1222, initiates operation of the cone loading stage, the cone filling stage, the optional tamping stage, the cone closing stage, and the optional cone evacuation stage. This initiation process is referred to herein as the global start cycle since a plurality of states are concurrently initiated.

During a single operation cycle, the cone loading stage, the cone filling stage, the optional tamping stage, the cone closing stage and the optional cone evacuation stage are each concurrently performed until completion. When the operations being performed at all of the stages have been completed, a new global start cycle is initiated. Depending upon the embodiment, the cone carousel 112 may be incremented by one cone receptacle 110 position at the conclusion of the completion of all stages (prior to the next global start cycle). Alternatively, the cone carousel 112 may be incremented by one cone receptacle 110 position at the as a first step of the next global start cycle.

To index the cone carousel 112 by one cone receptacle position, the processor 1212 generates and communicates a control signal to the carousel motor interface 1230. In response to receiving the control signal, the carousel motor interface 1230 communicates a signal to the carousel indexing motor 226. In response thereto, the carousel indexing motor 226 rotates (indexes) the cone carousel 112 by one cone receptacle position. In an example embodiment, the carousel motor interface 1230 generates a step voltage signal for a predefined duration that operates the carousel indexing motor 226 for the predefined duration to index the cone carousel 112. Other embodiments may employ other motor controllers and signals to index the cone carousel 112. In embodiments where a pneumatic stepping actuator is used to index the cone carousel 112, a control signal is sent to a solenoid to actuate the indexing of the cone carousel 112.

In some embodiments, the cone carousel 112 is indexed one cone receptacle position in a clockwise direction such that a cone receptacle 110 passes sequentially through the cone loading stage, the optional tamping stage, the cone filling stage, the cone closing stage and the optional cone evacuation stage. In other embodiments, the cone carousel 112 rotates in a counter clockwise direction such that a cone receptacle 110 passes sequentially through the cone loading stage, the optional tamping stage, the cone filling stage, the cone closing stage and the optional cone evacuation stage.

During the cone loading stage performed by the cone dispenser system 102, the processor 1212 operates to generate an actuation signal that is communicated from the roller drive interface 1232 to the roller drive motor 408. Preferably, the signal is a step voltage signal that operates the roller drive motor 408 for a predefined period of time. Accordingly, the roller drive interface 1232 receives the actuation signal from the processor 1212, and then generates the step voltage function or the like that is communicated to the roller drive motor 408. As noted herein, the operation of the roller drive motor 408 transports an empty cone from the cone stack feed tube 404 into the cone chute 220.

After the empty cone has entered the cone chute 220, the roller drive motor 408 is deactivated such that the cone roller 218 becomes secured in a stationary position. Then, after some predefined duration, the cone filler control system 114 issues a control signal to the cone loader air line interface 1234. In response to receiving the control signal from the cone filler control system 114, the cone loader air line interface 1234 outputs a voltage and/or a current signal to the cone loader air line system 1208. The cone loader air line system 1208 comprises one of the solenoids 202, a corresponding air compressor unit 204, and the air line 412. The signal from the cone loader air line interface 1234 to the cone loader air line system 1208 causes the solenoid 202 to actuate, thereby causing the air compressor unit 204 to generate pressurized air that is communicated through the air line 412. A puff or stream of air or other gas then exits from the air nozzle 410 to push the empty cone downward through the cone chute 220. If multiple gas puffs are required, the cone filler control system 114 generates further control signals that are received by the cone loader air line interface 1234. If a plurality of air lines 412 are employed, then the cone filler control system 114 coordinates control signals to a plurality of cone loader air line interfaces 1234 that are each connected to a corresponding cone loader air line system 1208.

In response to receiving a signal at the optical sensor interface 1236 from the optical sensor 224 indicating that a cone has been loaded into the cone receptacle 110 that is located below the cone chute 220, the cone filler control system 114 determines that the cone loading stage is then complete. Here, the optical sensor interface 1236 converts the signal received from the optical sensor 224 into a control signal that is receivable by the processor 1212.

In embodiments that employ the optional cone packer actuator 206, the cone filler control system 114 initiates the tamping stage by generating and communicating a control signal to the cone tamper interface 1238. In response to receiving the control signal from the processor 1212, the cone tamper interface 1238 outputs a voltage and/or a current signal to the cone content tamper system 1206. The cone content tamper system 1206 comprises one of the solenoids 202, a corresponding air compressor unit 204, and the cone packer actuator 206. The signal from the cone tamper interface 1238 to the cone loader air line system 1208 causes the solenoid 202 to actuate, thereby causing the air compressor unit 204 to generate pressurized air that is communicated to the cone packer actuator 206. The compressed air extends the packing tool 208 downward onto the top of a filled cone, thereby tamping down the smokable material in the cone. If multiple tampings are required, the cone filler control system 114 generates further control signals that are received by the cone content tamper system 1206.

During the cone closing stage performed by the cone top sealing system 104, the processor 1212, executing the OS logic 1220, optionally operates to initially generate an actuation signal that is communicated from the processor 1212 to the cone top sealing interface (I) 1240. In response to receiving the control signal from the processor 1212, the cone top sealing interface 1240 outputs a voltage and/or a current signal to the cone top seal system 1204. In an example embodiment, the cone top seal system 1204 comprises one of the solenoids 202, a corresponding air compressor unit 204, and the cone top sealing actuator 216. The signal from the cone top sealing interface 1240 to the cone top seal system 1204 causes the solenoid 202 to actuate, thereby causing the air compressor unit 204 to generate pressurized air that is communicated to the cone top sealing actuator 216. The compressed air extends the sealing head 708 downward onto the top of a filled cone that is to be closed, thereby tamping down the smokable material in the cone. If multiple tampings are required, the cone filler control system 114 generates further control signals that are received by the cone top seal system 1204.

Next, the processor system generates and communicates a control signal to the first cone closer interface (I) 1242*a*. In response to receiving the control signal from the processor 1212, the first cone closer interface 1242*a* outputs a voltage and/or a current signal to the first cone closer system 1202*a*. In an example embodiment, the first cone closer system 1202*a* comprises one of the solenoids 202, a corresponding air compressor unit 204, and the first cone top closing actuator 210. The signal from the first cone closer interface 1242*a* to the first cone closer system 1202*a* causes the solenoid 202 to actuate, thereby causing the air compressor unit 204 to generate pressurized air that is communicated to the first cone top closing actuator 210. The compressed air extends the closing head 702 downward onto the top of a filled cone that is to be closed, thereby making the first fold in the top of cone. If multiple tampings are required, the cone filler control system 114 generates further control signals that are received by the first cone closer system 1202*a*.

Next, the processor 1212 may operate to generate another actuation signal that is communicated from the processor 1212 to the cone top sealing interface 1240. In response to receiving the control signal from the processor 1212, the cone top sealing interface 1240 outputs another voltage and/or a current signal to the cone top seal system 1204. Compressed air extends the sealing head 708 downward onto the top of a filled cone that is to be closed, thereby sealing the first fold. If multiple tampings are required to seal the first fold, the cone filler control system 114 generates further control signals that are received by the cone top seal system 1204.

Next, the processor system generates and communicates a control signal to the second cone closer interface (I) 1242*b*. In response to receiving the control signal from the processor 1212, the second cone closer interface 1242*b* outputs a voltage and/or a current signal to the second cone closer system 1202*b*. In an example embodiment, the second cone closer system 1202*b* comprises one of the solenoids 202, a corresponding air compressor unit 204, and the second cone top closing actuator 212. The signal from the second cone closer interface 1242*b* to the second cone closer system 1202*b* causes the solenoid 202 to actuate, thereby causing the air compressor unit 204 to generate pressurized air that is communicated to the second cone top closing actuator 212. The compressed air extends the closing head 704 downward onto the top of a filled cone that is to be closed and sealed, thereby making a second fold in the top of cone. If multiple tampings are required, the cone filler control system 114 generates further control signals that are received by the second cone closer system 1202*b*.

Next, the processor 1212 may again operate to generate an actuation signal that is communicated from the processor 1212 to the cone top sealing interface 1240. In response to receiving the control signal from the processor 1212, the cone top sealing interface 1240 outputs another voltage and/or a current signal to the cone top seal system 1204. Compressed air extends the sealing head 708 downward onto the top of a filled cone that is to be closed, thereby sealing the first and second folds. If multiple tampings are required to seal the first and second folds, the cone filler control system 114 generates further control signals that are received by the cone top seal system 1204.

Then, the processor system generates and communicates a control signal to the third example (i$^{th}$) cone closer interface (I) 1242*i*. In response to receiving the control signal from the processor 1212, the cone closer interface 1242*i* outputs a voltage and/or a current signal to the third cone closer system 1202*i*. In an example embodiment, the cone closer system 1202*i* comprises one of the solenoids 202, a corresponding air compressor unit 204, and the third cone top closing actuator 214. The signal from the cone closer interface 1242*i* to the third cone closer system 1202*i* causes the solenoid 202 to actuate, thereby causing the air compressor unit 204 to generate pressurized air that is communicated to the third cone top closing actuator 214. The compressed air extends the closing head 706 downward onto the top of a filled cone that is to be closed and sealed, thereby making the third fold in the top of cone. If multiple tampings are required, the cone filler control system 114 generates further control signals that are received by the cone closer system 1202*i*.

Finally, the processor 1212 may again operate to generate an actuation signal that is communicated from the processor 1212 to the cone top sealing interface 1240. In response to receiving the control signal from the processor 1212, the cone top sealing interface 1240 outputs another voltage and/or a current signal to the cone top seal system 1204. Compressed air extends the sealing head 708 downward onto the top of a filled cone that is to be closed, thereby sealing the first, second, and third folds. If multiple tampings are required to seal the first, second, and third folds, the cone filler control system 114 generates further control signals that are received by the cone top seal system 1204.

In other embodiments, two, or more than two, cone closer interfaces may be used to control operation of corresponding cone top closing actuators to create any desired number of folds on the top of a filled cone. For example, four cone top closing actuators may be used to close and seal the cone top in an alternative embodiment. Any suitable number of cone top closing actuators may be used in the various embodiments.

The user interface logic 1222, under the execution of the processor 1212, is configured to receive one or more user commands that are intended to control the amount of smokable material that is to be added into a cone during the cone filling stage. The amount of smokable material added into a cone is precisely controlled by controlling the duration of the rotational operation of the auger 126. In a preferred embodiment, the rotational speed of the auger is predefined and is precisely controlled by the auger drive motor 120. Accordingly, the amount of smokable material that is added from the auger 126 into a cone over a per unit of time (duration) is determinable. Accordingly, the amount of smokable material that is added into an empty cone is readily controllable as is appreciated in the arts. The cone filler control system 114 simply processes a user command defining the desired amount of smokable material that is to be added into an empty cone, and then computes the auger operation time duration (interchangeably referred to herein as the determined duration) for the auger 126. The processor 1212 communicates a control signal corresponding to the computed auger operation time duration to the auger interface 1243. The auger interface 1243, in an example embodiment, generates and communicates a voltage and/or current signal to the auger drive motor 120 for the computed auger operation time duration. At the end of the duration, the rotation of the auger 126 is halted, thereby preventing additional smokable material from being added into the now-filled cone. This cone filling process is performed one time after the start of each global start cycle.

In embodiments with a touch sensitive screen display 1216, the user may specify a desired amount of smokable material that is to be entered into an empty cone. Here, a user's touch of an active area on the touch sensitive screen corresponds to a user input. In response to sensing the user's touch on a particular active area on the touch sensitive screen display 1216, the touch sensitive screen display 1216 generates a user input signal that is communicated to the processor 1212, wherein the communicated user input signal corresponds to the intended user input.

Figure 13:
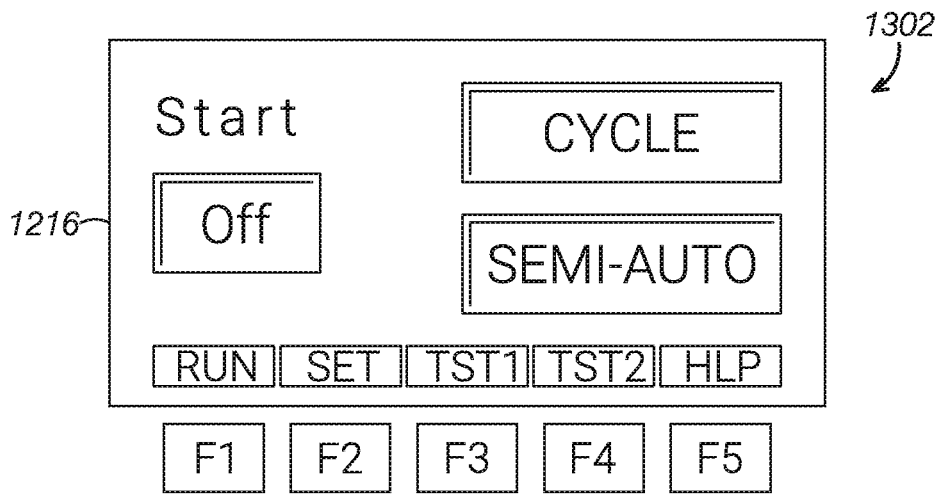
FIG. 13 is an example graphical user interface (GUI) that is presented on the display of an example embodiment of the cone filling system.

FIG. 13 is an example graphical user interface (GUI) 1302 that is presented on the display 1216 of an example embodiment of the cone filling system 100. A plurality of controllers F1-F5 residing on the surface of the cone filler control system 114 enclosure are also illustrated. In other embodiments, the GUI 1302, or a similar GUI, may be presented on the display of the electronic device 1228 (FIG. 12). The GUI 1302 is a conceptual non-limiting example of a GUI that may be presented to the user. Alternative embodiments may present another GUI with more information, or less information, or different information, to the user. The non-limiting GUI 1302 may be presented to the user before the user initiates the global start cycle to begin the filling and sealing of cones using the cone filling system 100. Alternatively, or additionally, one or more of the functions indicated on the example GUI 1302 may be implemented using a physical actuator, such as a button, switch, or the like. In alternative embodiments, any suitable text may be used to inform the user of the various operational states and/or settings in effect or that may be available for selection by the user.

The example GUI 1302 conceptually illustrates a presentation made to the user prior to the start of operation of the cone filling system 100. Accordingly, the highlighted "OFF" icon, an active area of the GUI 1302, indicates to the user that the cone filling system 100 is not operating (in an off state). Operation of the cone filling system 100 may be initiated if the user touches the "OFF" icon, wherein an "ON" icon may then be displayed to indicate that the cone filling system 100 is now in an operational state.

The user may select the "CYCLE" icon active area to initiate a single cycle that concurrently operates the cone loading stage, the cone filling stage, the optional tamping stage, the cone closing stage, and the optional cone evacuation stage. Here, the user may want to conduct one or more test cycles to verify that the cone filling system 100 is operating as intended.

The "SEMI-AUTO" icon active area indicates to the user that the cone filling system 100 is configured to operate on a semi-automatic basis wherein the cone filling system 100 operates through a complete cycle to load cones into the cone receptacles 110, fill empty cones with the smokable material, and then seal all of the cones of the cone carousel 112. Once all cones in the plurality of cone receptacles 110 in a cone carousel 112 have been filled and sealed, the process ends and the cone filling system 100 ceases operation.

Alternatively, the user may touch the presented "SEMI-AUTO" icon active area to toggle operation to continuous operation. Here, the presented icon would change to "FULL AUTO" active area or the like to indicate to the user that the cone filling system 100 is set to operate on a continuous basis. This mode of operation may be suitable when the cone filling system 100 performs a cone evacuation process to evacuate full and sealed cones from the cone carousel 112.

A plurality of relatively small hot buttons (touch sensitive active area icons) are presented along the bottom portion of the display 1216. When touched by the user, the hot buttons cause the cone filling system 100 to implement an associated function. The text presented on each of the hot buttons intuitively informs the user of the associated function that will be performed by the cone filling system 100 if actuated by the user. Any suitable text may be used to intuitively indicate a function to the user. In alternative embodiments, any suitable number of hot buttons may be presented on the display 1216 at any suitable location.

For example, if the user touches the "RUN" hot button, the global start cycle may be initiated. As another example, if the user touches the "SET" hot button, the screen display may be changed to a set up screen (see FIG. 14 or FIG. 15) that enables the user to control various settings of interest. As another example, the "TST 1" hot button may load an empty cone into a cone receptacle 110 to test operation of the cone loading stage or to fill an empty cone. The "TST 2" hot button may be configured to sequentially operate the actuators 210, 212, 214, 216 to test their operation to test the cone closing stage. The "HLP" hot button causes the display 1216 to present a help menu to assist the user in answering operating questions, resolving issues, or the like.

Conceptually illustrated below the display 1216 are a plurality of physical function buttons F1-F5. In an example embodiment, the function buttons control which particular GUI is presented on the display 1216. For example, actuation of the "F1" function button may cause the example GUI 1302 to be presented on the display 1216. Actuation of other ones of the function buttons F2-F5 may cause other GUIs to be presented to the user. In some embodiments, the function buttons F1-F5 may be presented on the display 1216 as hot buttons that can be selected by touching on the corresponding surface area of the display 1216.

Figure 14:
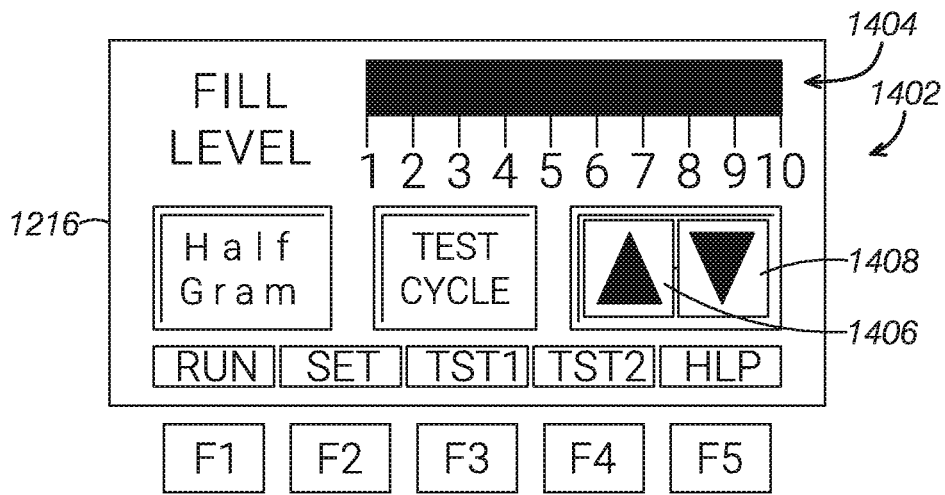
FIGS. 14-15 conceptually illustrate a presented GUI indicating a current user specified fill level or amount defining an amount of smokable material that is to be added into an empty cone during operation of the cone filling stage.

FIG. 14 conceptually illustrates a presented GUI 1402 indicating a current user specified fill level or amount defining an amount of smokable material that is to be added into an empty cone during operation of the cone filling stage. Here, a fill level bar 1404 indicates a plurality of fill levels ranging from a fill level of one (I) to a fill level of ten (10). The user intuitively understands that with the indicated fill level of 1, the empty cone will be partially filled during the cone filling stage. The user appreciates that each numerical increment on the fill level bar 1404 corresponds to an incremental amount of smokable material that will be added into an empty cone.

The user further appreciates that touching the hot button 1406 indicating the upward pointing arrowhead is an active area that will incrementally increase the fill level by some predefined amount. In an example embodiment, when the user touches the second active area indicating the incremental increase in the user specified amount of smokable material, the user intuitively understands that the amount of dispensed smokable material will be increased. To increase the amount of dispensed smokable material, the cone filler control system 114 increases the determined duration by an incremental duration to that a new determined duration is 6,500 milliseconds plus the incremental duration of 50 milliseconds. When the auger drive motor 120 operates to rotate the auger 126 for the new determined duration of 6,500 milliseconds plus the incremental duration of 50 milliseconds in response to the control signal. The helical screw blade of the auger 126 rotates to dispense more than the gram of smokable material out from the lower portion 128 of the hopper 116 into the empty cone. Any suitable increasing incremental duration may be used in alternative embodiments.

Similarly, touching the hot button 1408 indicating the downward point arrow will incrementally decrease the fill level by some predefined amount. In an example embodiment, when the user touches the second active area indicating the incremental decrease in the user specified amount of smokable material, the determined duration is decreased by an incremental duration to that a new determined duration is 6,500 milliseconds minus the incremental duration of 50 milliseconds. When the auger drive motor 120 operates to rotate the auger 126 for the determined duration of 6,500 milliseconds minus the incremental duration of 50 milliseconds in response to the control signal. The helical screw blade of the auger 126 rotates to dispenses less than the gram of smokable material out from the lower portion 128 of the hopper 116 into the empty cone. Any suitable decreasing incremental duration may be used in alternative embodiments.

In alternative embodiments, the user may be able to select one of a plurality of specified base amounts of smokable material. For example, the user may be able to select from a half gram, three quarters of a gram, a full gram, etc. Any suitable number of selectable amount choices and/or amount values may be provide to the user.

In an example embodiment, the user may be able to specify the amount values to the cone filler control system 114 to define the amount of smokable material that is to be put into an empty cone. Alternatively, or additionally, the user may be able to define the increasing or decreasing incremental durations and/or the associated incremental amounts of smokable material. The user may use the touch sensitive display screen 128 or another electronic device 1228 to specify these values, incremental durations and/or amounts prior to operation of the cone filling system 100.

Figure 15:
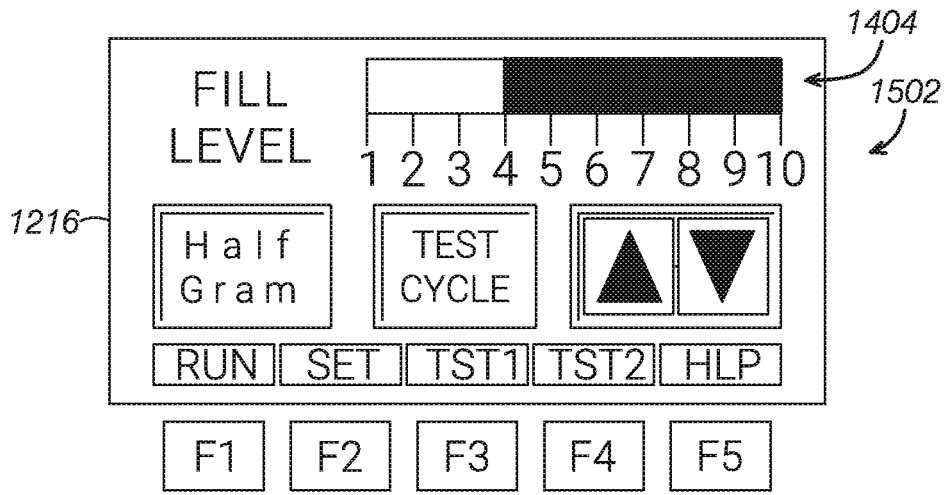

FIG. 15 conceptually illustrates a presented GUI 1502 indicating a current user specified fill level 1405 of four (4). The fill level of four defines an amount of smokable material that is to be added into an empty cone during operation of the cone filling stage. Here, one skilled in the art appreciates that the user has touched the hot button 1406 three times to increment the fill level from one (1) as illustrated in FIG. 14 to four (4) as illustrated in FIG. 15.

The "HALF GRAM" hot button, interchangeably referred to herein as an active area that is presented at a predefined portion of a touch sensitive screed display, indicates to the user that the incremental adjustment amounts are based on a half gram of smokable material. If the user touches the half gram hot button, the presentation transitions to a "FULL GRAM" hot button on the display 1216. Here, the user appreciates that that the incremental adjustment amounts are based on a full gram of smokable material.

The "TEST CYCLE" hot button initiates a test cycle wherein an empty cone is filled in accordance with the current fill setting indicated on the GUI 1402 or 1502. Accordingly, the user may touch the test cycle hot button, and a cone will be filled and sealed in accordance with the current fill settings. If the test filling of a cone was satisfactory, the user can initiate a full production run wherein a plurality of cones are filled and sealed in accordance with the current fill settings. If the test cone is not filled as desired, the user can revise the current fill settings, and then conduct another test cycle.

Figure 16:
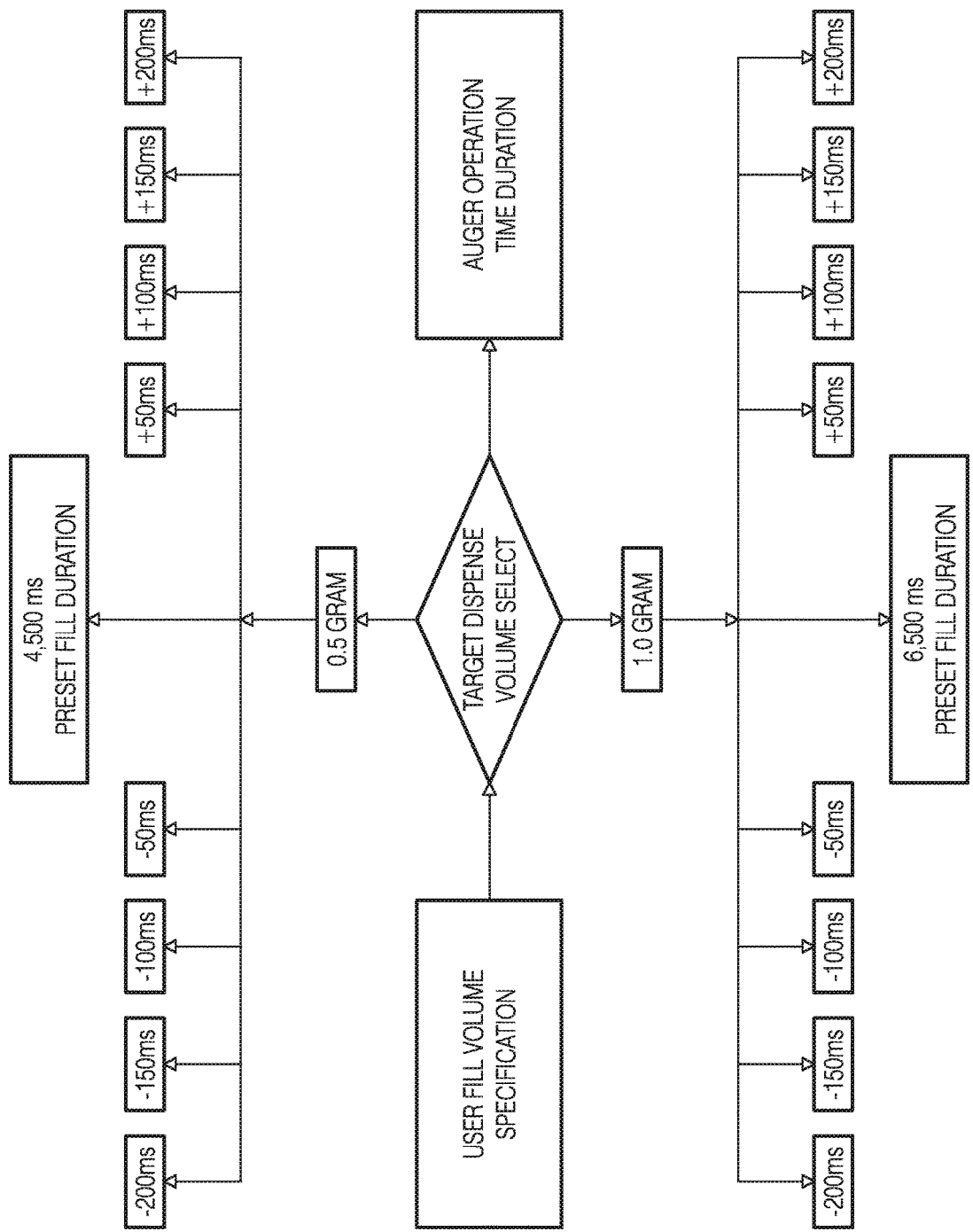
FIG. 16 conceptually illustrates the relationship between a target dispense volume specified by a user and the auger operation time duration calculations.

FIG. 16 conceptually illustrates the relationship between a target dispense volume specified by a user and the auger operation time duration calculations performed by the processor 1212 (FIG. 12) executing the OS logic 1220. The auger operation time duration is the time period that the auger 126 is rotated to dispense the smokable material from the hopper 116. The auger operation time duration calculation is based on a specified user target dispense volume. The computed auger time duration calculation is preferably saved in the auger settings 1224 portion of memory 1214 (FIG. 12). Thus, as each global start cycle is initiated by the cone filler control system 114, the current auger time duration may be retrieved for each cone filling stage operation as the cone carousel 112 is indexed by one cone receptacle 110.

As conceptually indicated in FIG. 16, the user may specify an initial fill level of a half gram (0.5 gram) or a full gram (1.0 gram) from the GUI 1402 (FIG. 14) or GUI 1502 (FIG. 5). The user input specifies an amount of the smokable material that is to be dispensed into an empty cone. Preferably, the specified amount is specified as a weight of the smokable material.

In a preferred embodiment, the user may specify either a half gram or a full gram as a base value for the specified amount of smokable material. If the full gram amount is specified by the user, the cone filler control system 114 determines that the auger operation time duration is to be set to 6,500 milliseconds (ms). If the half gram amount is specified by the user, the cone filler control system 114 determines that the auger operation time duration is to be set to 4,500 milliseconds (ms). These durations are determined and predefined based on the known amount of smokable material that is dispensed from the rotation auger 126 to dispense a half gram or a full gram of smokable material into an empty cone during the cone filling stage.

Because physical characteristics of the smokable material may vary, the actual amount of dispensed smokable material for any particular auger operation time determinable duration may vary. Accordingly, the user may actuate the example "TST 1" hot button (FIG. 13) to test fill an empty cone. Upon inspection of the filled test cone, the user may wish to add more or to add less smokable material in to an empty cone.

Accordingly, the user may adjust the fill level touching the hot button 1406 to incrementally increase the amount of smokable material that is dispensed into an empty cone. In an example embodiment, a user selection of one increase increment in the specified amount causes the cone filler control system 114 to determine a new predefined duration that increases the auger operation time duration by fifty ms (+50 ms). Each additional increment in the user specified amount causes the cone filler control system 114 to determine a new predefined duration that increases the auger operation time duration by an additional 50 ms.

Conversely, the user may adjust the fill level touching the hot button 1408 to incrementally decrease the amount of smokable material that is dispensed into an empty cone. In an example embodiment, a user selection of one decrease increment decreases the auger operation time duration by fifty ms (−50 ms). Each additional increment decreases the auger operation time duration by an additional 50 ms. For example, FIG. 15 illustrates a setting level of 4, and illustrates a half gram setting. Here, the adjustment made to the 4.500 ms auger operation time duration is −50 ms to correspond with the setting 4 shown on the GUI 1502.

The current auger operation time duration, after testing so that the user is satisfied with the amount of smokable material that is added into an empty cone, may then be accepted by the user as the current cone fill setting. Here, the determined auger operation time duration is stored into the auger setting 1224 portion of memory 1214.

The control logic that is used to adjust the auger operation time duration based on user specifications is managed by the user interface logic 1222 in an example embodiment. Any suitable base value auger operation time duration for a half gram setting and/or a full gram setting may be specified by a user. Further, any suitable auger operation time duration increment can be specified by a user. That is, the example 4,500 ms auger operation time duration base setting for a half gram, the 6,500 ms auger operation time duration base setting, and the amount of time for an incremental adjustment may be specified by the user, preferably during an initial set up of the cone filling system 100.

It should be emphasized that the above-described embodiments of the cone filling system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element. "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A cone top sealing system that closes and seals a cone that is filled with a smokable material, comprising:
    a control system;
    a cone top sealing actuator, wherein the cone top sealing actuator extends a sealing head downward onto a top of the cone filled with the smokable material;
    a first cone top closing actuator that extends a first closing head in a first downward slant onto an open top of the cone filled with the smokable material, wherein the first closing head contacts a first portion of the open top of the cone filled with the smokable material to form a first fold on the top of the cone;
    a second cone top closing actuator that extends a second closing head in a second downward slant onto the open top of the cone filled with the smokable material, wherein the second closing head contacts a second portion of the open top of the cone filled with the smokable material to form a second fold on the top of the cone;
    a third cone top closing actuator that extends a third closing head in a third downward slant onto the open top of the cone filled with the smokable material, wherein the third closing head contacts a third portion of the open top of the cone filled with the smokable material to form a third fold on the top of the cone,
    wherein the control system communicates a first control signal that actuates the first cone top closing actuator to extend the first closing head to form the first fold,
    wherein, after the first control signal is communicated, the control system communicates a second control signal that actuates the cone top sealing actuator to extend the sealing head downward onto the first fold,
    wherein, after the second control signal is communicated, the control system communicates a third control signal that actuates the second cone top closing actuator to extend the second closing head to form the second fold,
    wherein, after the third control signal is communicated, the control system communicates a fourth control signal that actuates the cone top sealing actuator to extend the sealing head downward onto the first fold and the second fold,
    wherein, after the fourth control signal is communicated, the control system communicates a fifth control signal that actuates the third cone top closing actuator to extend the second closing head to form the third fold, and
    wherein, after the fifth control signal is communicated, the control system communicates a sixth control signal that actuates the cone top sealing actuator to extend the sealing head downward onto the first fold, the second fold, and the third fold.

2. The cone top sealing system of claim 1, wherein prior to the first control signal, the control system communicates a control signal that actuates the cone top sealing actuator to extend the sealing head downward onto the open top of the cone filled with the smokable material to pack the smokable material into the cone.

3. The cone top sealing system of claim 1, wherein the cone top sealing actuator, the first cone top closing actuator, the second cone top closing actuator, and the third cone top closing actuator are pneumatic actuators that extend their respective head in response to receiving pressurized air.

4. The cone top sealing system of claim 3, further comprising:
    a first air compressor unit coupled to a first air inlet of the first cone top closing actuator, wherein in response to the control system communicating the first control signal, the first air compressor generates pressurized air that actuates the first cone top closing actuator to extend the first closing head to form the first fold;
    a second air compressor unit coupled to a second air inlet of the second cone top closing actuator, wherein in response to the control system communicating the third control signal, the second air compressor generates pressurized air that actuates the second cone top closing actuator to extend the second closing head to form the second fold;
    a third air compressor unit coupled to a third air inlet of the third cone top closing actuator, wherein in response to the control system communicating the fifth control signal, the third air compressor generates pressurized air that actuates the third cone top closing actuator to extend the third closing head to form the third fold; and
    a fourth air compressor unit coupled to a fourth air inlet of the cone top sealing actuator, wherein in response to the control system communicating the second control signal, the fourth control, and the sixth control signal, the fourth air compressor generates pressurized air that actuates the cone top sealing actuator to extend the sealing head downward onto a top of the cone filled with the smokable material.

5. The cone top sealing system of claim 4, further comprising:
    a first solenoid coupled to the first air compressor unit and communicatively coupled to the control system, wherein in response to receiving the first control signal communicated from the control system, the first solenoid actuates to cause the first air compressor to generate pressurized air, a second solenoid coupled to the second air compressor unit and communicatively coupled to the control system, wherein in response to receiving the third control signal communicated from the control system, the second solenoid actuates to cause the second air compressor to generate pressurized air;

a third solenoid coupled to the third air compressor unit and communicatively coupled to the control system, wherein in response to receiving the fifth control signal communicated from the control system, the third solenoid actuates to cause the third air compressor to generate pressurized air; and a fourth solenoid coupled to the fourth air compressor unit and communicatively coupled to the control system, wherein in response to receiving the second control signal, the fourth control signal, and the sixth control signal communicated from the control system, the fourth solenoid actuates to cause the fourth air compressor to generate pressurized air.

6. The cone top sealing system of claim 1,
wherein the first cone top closing actuator is a first electrical actuator that is communicatively coupled to the control system and that extends the first closing head in response to receiving the first control signal communicated from the control system,
wherein the second cone top closing actuator is a second electrical actuator that is communicatively coupled to the control system and that extends the second closing head in response to receiving the third control signal communicated from the control system,
wherein the third cone top closing actuator is a third electrical actuator that is communicatively coupled to the control system and that extends the third closing head in response to receiving the fifth control signal communicated from the control system, and
wherein the cone top sealing actuator is a fourth electrical actuator that is communicatively coupled to the control system and that extends the sealing head in response to receiving the second control signal, the fourth control signal, and the sixth control signal communicated from the control system.

7. The cone top sealing system of claim 1, wherein cone top sealing actuator, the first cone top closing actuator, the second cone top closing actuator, and the third cone top closing actuator are hydraulic actuators that extend their respective head in response to receiving pressurized liquid.

8. The cone top sealing system of claim 1,
wherein the control system communicates a plurality of first control signals that actuate the first cone top closing actuator to extend the first closing head a first plurality of times to form the first fold,
wherein the control system communicates a plurality of second control signals that actuate the cone top sealing actuator to extend the sealing head a second plurality of times downward onto the first fold,
wherein the control system communicates a plurality of third control signals that actuate the second cone top closing actuator a third plurality of times to extend the second closing head to form the second fold,
wherein the control system communicates a plurality of fourth control signals that actuate the cone top sealing actuator to extend the sealing head downward a fourth plurality of times onto the first fold and the second fold, wherein the control system communicates a plurality of fifth control signals that actuate the third cone top closing actuator to extend the second closing head a fifth plurality of times to form the third fold, and
wherein the control system communicates a plurality of sixth control signals that actuate the cone top sealing actuator to extend the sealing head downward a sixth plurality of times onto the first fold, the second fold, and the third fold.

9. The cone top sealing system of claim 1,
wherein after the first cone top closing actuator extends the first closing head to form the first fold, the first cone top closing actuator retracts the first closing head,
wherein after the first closing head is retracted, the cone top sealing actuator extends the sealing head downward onto the first fold,
wherein after the cone top sealing actuator extends the sealing head onto the first fold, the cone top sealing actuator retracts the sealing head,
wherein after the sealing head is retracted, the second cone top closing actuator extends the second closing head to form the second fold,
wherein after the second cone top closing actuator extends the second head to form the second fold, the second cone top closing actuator retracts the second head,
wherein after the second closing head is retracted, the cone top sealing actuator extends the sealing head downward onto the first fold and the second fold,
wherein after the cone top sealing actuator extends the sealing head onto the first fold and the second fold, the cone top sealing actuator retracts the sealing head,
wherein after the sealing head is retracted, the third cone top closing actuator extends the third closing head to form the third fold,
wherein after the third cone top closing actuator extends the third head to form the third fold, the third cone top closing actuator retracts the third head,
wherein after the third closing head is retracted, the cone top sealing actuator extends the sealing head downward onto the first fold, the second and the third fold, and
wherein after the cone top sealing actuator extends the sealing head onto the first fold, the second fold, and the third fold, the cone top sealing actuator retracts the sealing head.

10. The cone top sealing system of claim 1, further comprising:
a fourth cone top closing actuator that extends a fourth closing head in a fourth downward slant onto the open top of the cone filled with the smokable material, wherein the fourth closing head contacts a fourth portion of the open top of the cone filled with the smokable material to form a fourth fold on the top of the cone,
wherein the control system communicates a seventh control signal that actuates the first cone top closing actuator to extend the first closing head to form the first fold, and
wherein the seventh control signal is communicated after the sixth control signal.

11. A method that closes and seals a cone that is filled with a smokable material, comprising:
communicating a first control signal from a control system to actuate a first cone top closing actuator that extends a first closing head in a first downward slant onto an open top of the cone filled with the smokable material, wherein the first closing head contacts a first portion of the open top of the cone filled with the smokable material to form a first fold on the top of the cone;

communicating a second control signal from the control system to actuate a cone top sealing actuator, wherein the cone top sealing actuator extends a sealing head downward onto the first fold;

communicating a third control signal from the control system to actuate a second cone top closing actuator that extends a second closing head in a second downward slant onto the open top of the cone filled with the smokable material, wherein the second closing head contacts a second portion of the open top of the cone filled with the smokable material to form a second fold on the top of the cone;

communicating a fourth control signal from the control system to actuate the cone top sealing actuator, wherein the cone top sealing actuator extends the sealing head downward onto the first fold and the second fold;

communicating a fifth control signal from the control system to actuate a third cone top closing actuator that extends a third closing head in a third downward slant onto the open top of the cone filled with the smokable material, wherein the third closing head contacts a third portion of the open top of the cone filled with the smokable material to form a third fold on the top of the cone; and communicating a sixth control signal from the control system to actuate the cone top sealing actuator, wherein the cone top sealing actuator extends the sealing head downward onto the first fold, the second fold, and the third fold.

12. The method of claim 11, retracting the first closing head of the first cone top closing actuator after the first cone top closing actuator extends the first closing head to form the first fold, wherein the sealing head is extended downward onto the first fold after the first closing head is retracted;

retracting the sealing head of the cone top sealing actuator after the cone top sealing actuator extends the sealing head onto the first fold, wherein the second cone top closing actuator extends the second closing head to form the second fold after the sealing head is retracted;

retracting the second closing head after the second cone top closing actuator extends the second closing head to form the second fold, wherein the cone top sealing actuator extends the sealing head downward onto the first fold and the second fold after the second closing head is retracted;

retracting the sealing head after the cone top sealing actuator extends the sealing head onto the first fold and the second fold, wherein the third cone top closing actuator extends the third closing head to form the third fold after the sealing head is retracted;

retracting the third closing head after the third cone top closing actuator extends the third head to form the third fold, wherein the cone top sealing actuator extends the sealing head downward onto the first fold, the second and the third fold after the third closing head is retracted; and retracting the sealing head after the cone top sealing actuator extends the sealing head onto the first fold, the second fold, and the third fold.

13. The method of claim 11, wherein prior to communicating the first control signal, the method further comprising:

communicating a control signal from the control system that actuates the cone top sealing actuator to extend the sealing head downward onto the open top of the cone filled with the smokable material to pack the smokable material into the cone.

14. The method of claim 11, wherein the cone top sealing actuator, the first cone top closing actuator, the second cone top closing actuator, and the third cone top closing actuator are electrical solenoids that are communicatively coupled to the control system and that extend their respective head in response to receiving control signals from the control system.

15. The method of claim 11, wherein the cone top sealing actuator, the first cone top closing actuator, the second cone top closing actuator, and the third cone top closing actuator are pneumatic actuators that extend their respective head in response to receiving pressurized air.

16. The method of claim 15, further comprising:

generating pressurized air that actuates the first cone top closing actuator to extend the first closing head to form the first fold using a first air compressor unit coupled to a first air inlet of the first cone top closing actuator;

generating pressurized air that actuates the second cone top closing actuator to extend the second closing head to form the second fold using a second air compressor unit coupled to a second air inlet of the second cone top closing actuator;

generating pressurized air that actuates the third cone top closing actuator to extend the third closing head to form the third fold a third air compressor unit coupled to a third air inlet of the third cone top closing actuator; and generating pressurized air that actuates the cone top sealing actuator to extend the sealing head downward onto a top of the cone filled with the smokable material using a fourth air compressor unit coupled to a fourth air inlet of the cone top sealing actuator.

17. The method of claim 16, further comprising:

receiving the first control signal communicated from the control system at a first solenoid coupled to the first air compressor unit, wherein the first solenoid is communicatively coupled to the control system, and wherein the first solenoid actuates to cause the first air compressor to generate pressurized air in response to receiving the first control signal;

receiving the third control signal communicated from the control system at a second solenoid coupled to the second air compressor unit, wherein the second solenoid is communicatively coupled to the control system, and wherein second solenoid actuates to cause the second air compressor to generate pressurized air in response to receiving the third control signal;

receiving the fifth control signal communicated from the control system at a third solenoid coupled to the third air compressor unit, wherein the third solenoid is communicatively coupled to the control system, and wherein the third solenoid actuates to cause the third air compressor to generate pressurized air in response to receiving the fifth control signal; and receiving the second control signal, the fourth control signal, and the sixth control signal communicated from the control system at a fourth solenoid coupled to the fourth air compressor unit, wherein the fourth solenoid is communicatively coupled to the control system, and wherein the fourth solenoid actuates to cause the fourth air compressor to generate pressurized air in response to receiving the second control signal, the fourth control signal, and the sixth control signal.

* * * * *